(12) United States Patent
Watanabe et al.

(10) Patent No.: US 7,664,538 B2
(45) Date of Patent: Feb. 16, 2010

(54) WIRELESS COMMUNICATION DEVICE AND CONTROL METHOD FOR THE DEVICE

(75) Inventors: Kazuhiro Watanabe, Tokyo (JP); Shin Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 620 days.

(21) Appl. No.: 11/381,330

(22) Filed: May 2, 2006

(65) Prior Publication Data

US 2006/0268796 A1 Nov. 30, 2006

(30) Foreign Application Priority Data

May 11, 2005 (JP) ............... 2005-139172

(51) Int. Cl.
*H04B 1/38* (2006.01)
(52) U.S. Cl. ............... 455/574; 455/522; 455/69; 455/13.4; 455/343.2; 370/318
(58) Field of Classification Search .......... 455/69, 455/13.4, 127.5, 343.1–343.6, 571–574, 455/522; 370/318
See application file for complete search history.

(56) References Cited

U.S. PATENT DOCUMENTS 6,545,999 B1 * 4/2003 Sugita ............... 370/347

2002/0077136 A1 * 6/2002 Maggenti et al. ............ 455/518
2005/0239518 A1 * 10/2005 D'Agostino et al. ........ 455/574
2006/0268796 A1 * 11/2006 Watanabe et al. ........... 370/338

FOREIGN PATENT DOCUMENTS

JP 11-266254 9/1999

* cited by examiner

*Primary Examiner*—Matthew D Anderson
*Assistant Examiner*—Shaima Q Aminzay
(74) *Attorney, Agent, or Firm*—K&L Gates LLP

(57) ABSTRACT

A wireless communication device is provided. The wireless communication device includes a communicate range and communicating with a destination device outside the communication range thorough at least one relay station. The wireless communication device includes power mode controlling means for performing power saving control of power supplied to the wireless communication device; forcing information holding means for holding forcing information including a forced mode flag indicating whether a forced operation instruction concerning the power saving control is enabled or disabled and a limited number of the relay stations; forcing information transmitting means for transmitting the forcing information to another wireless communication device within the communication range of the wireless communication device; and forcing-information update controlling means for updating the forcing information.

26 Claims, 25 Drawing Sheets

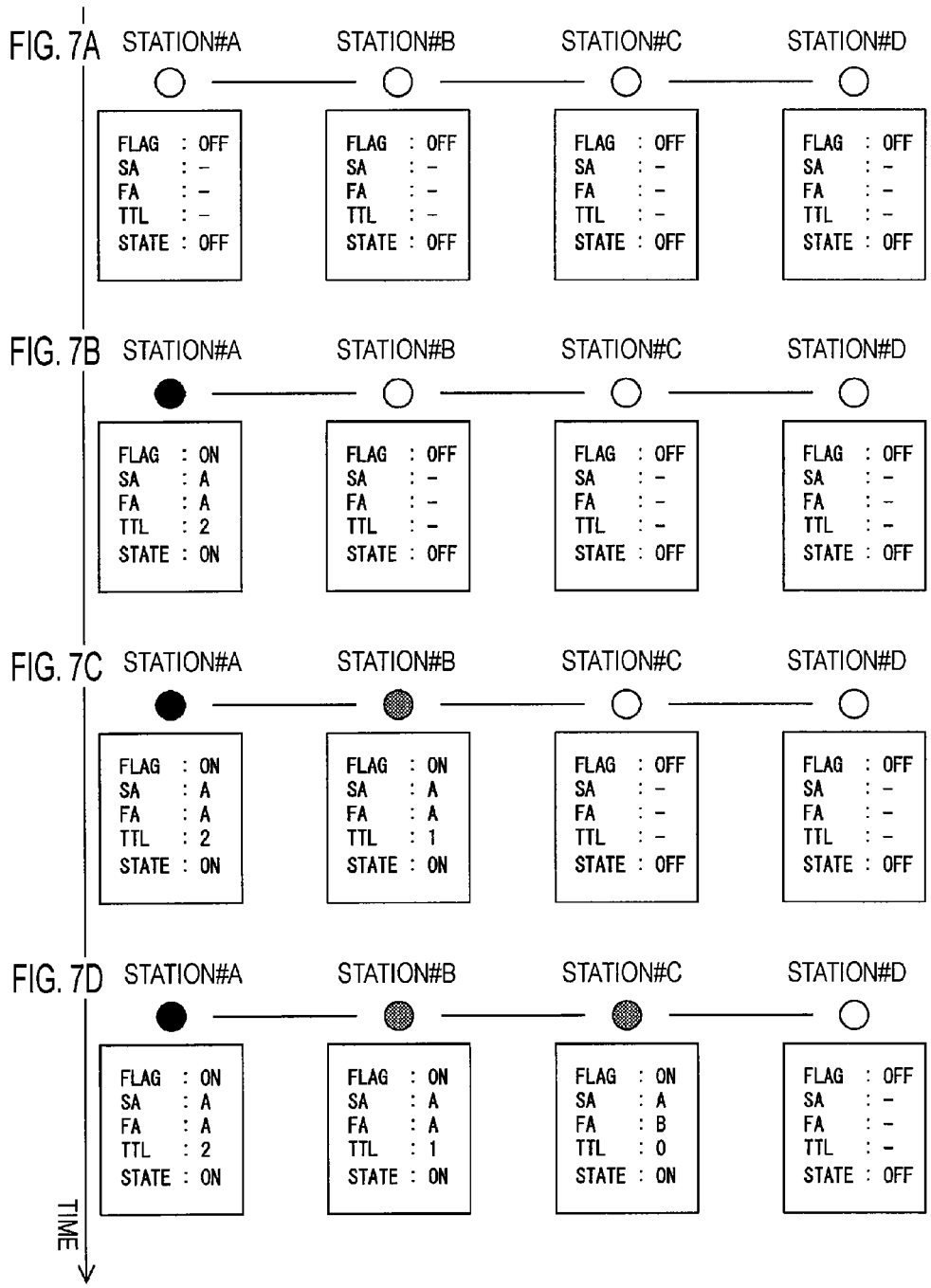

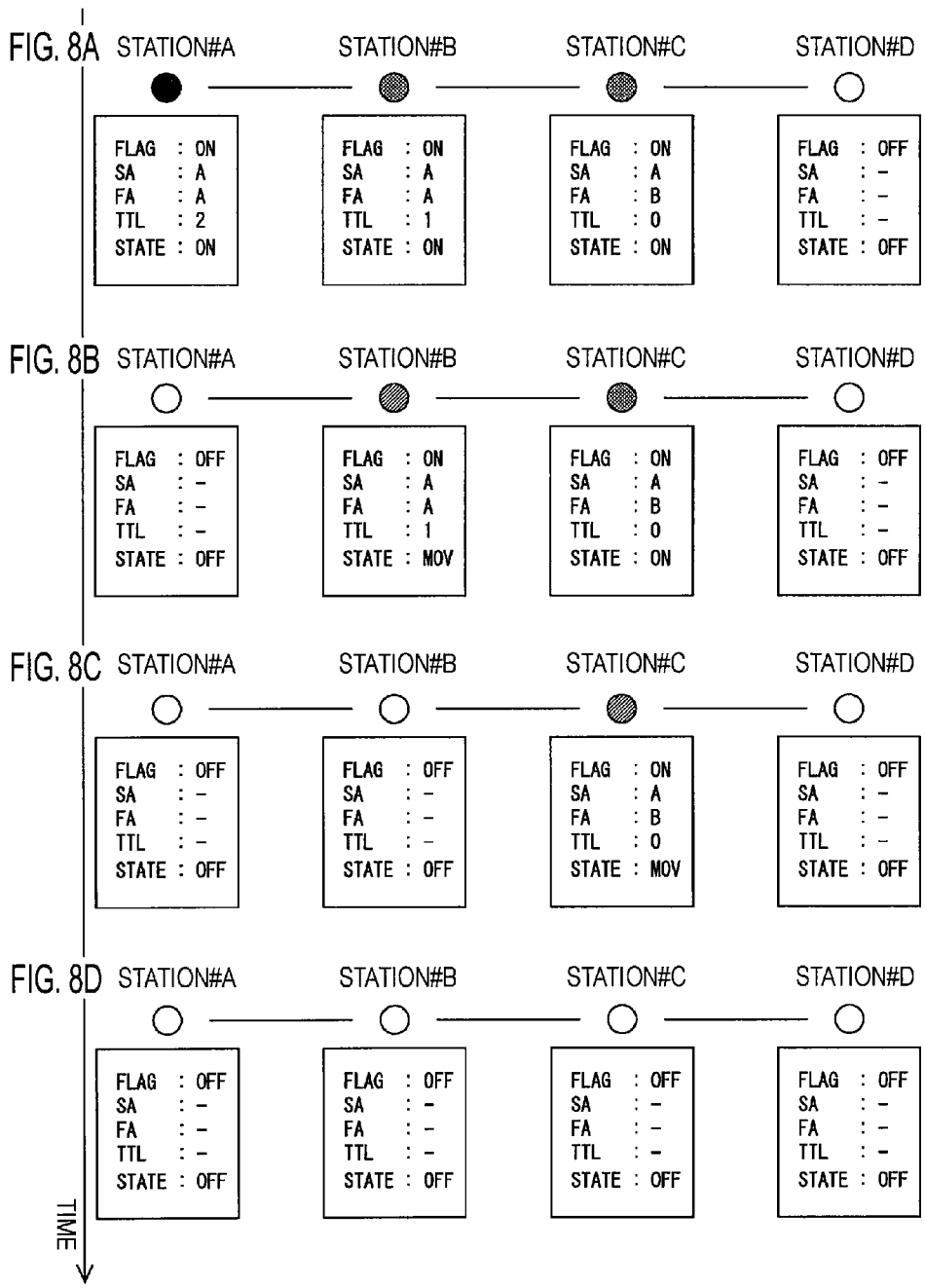

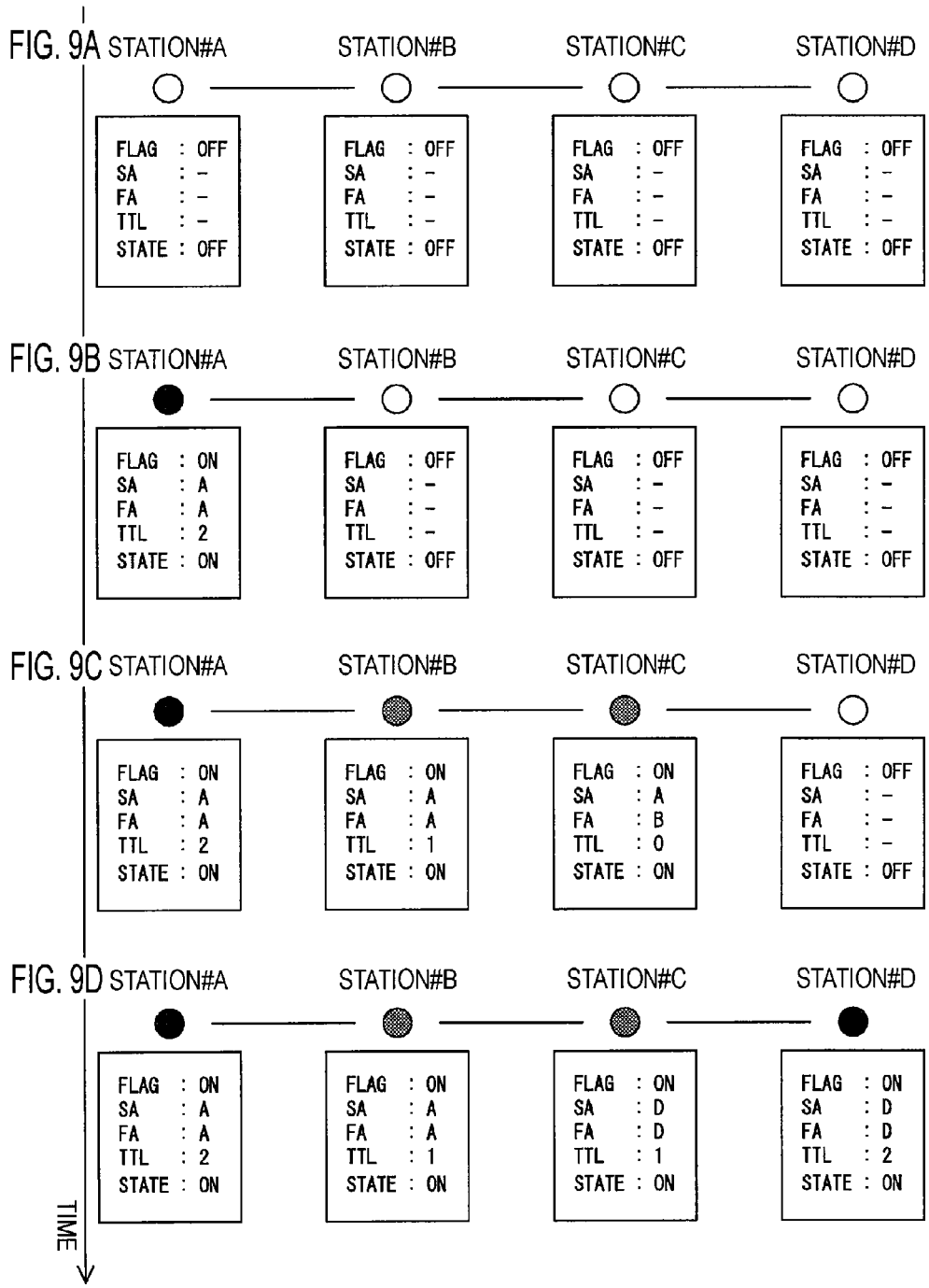

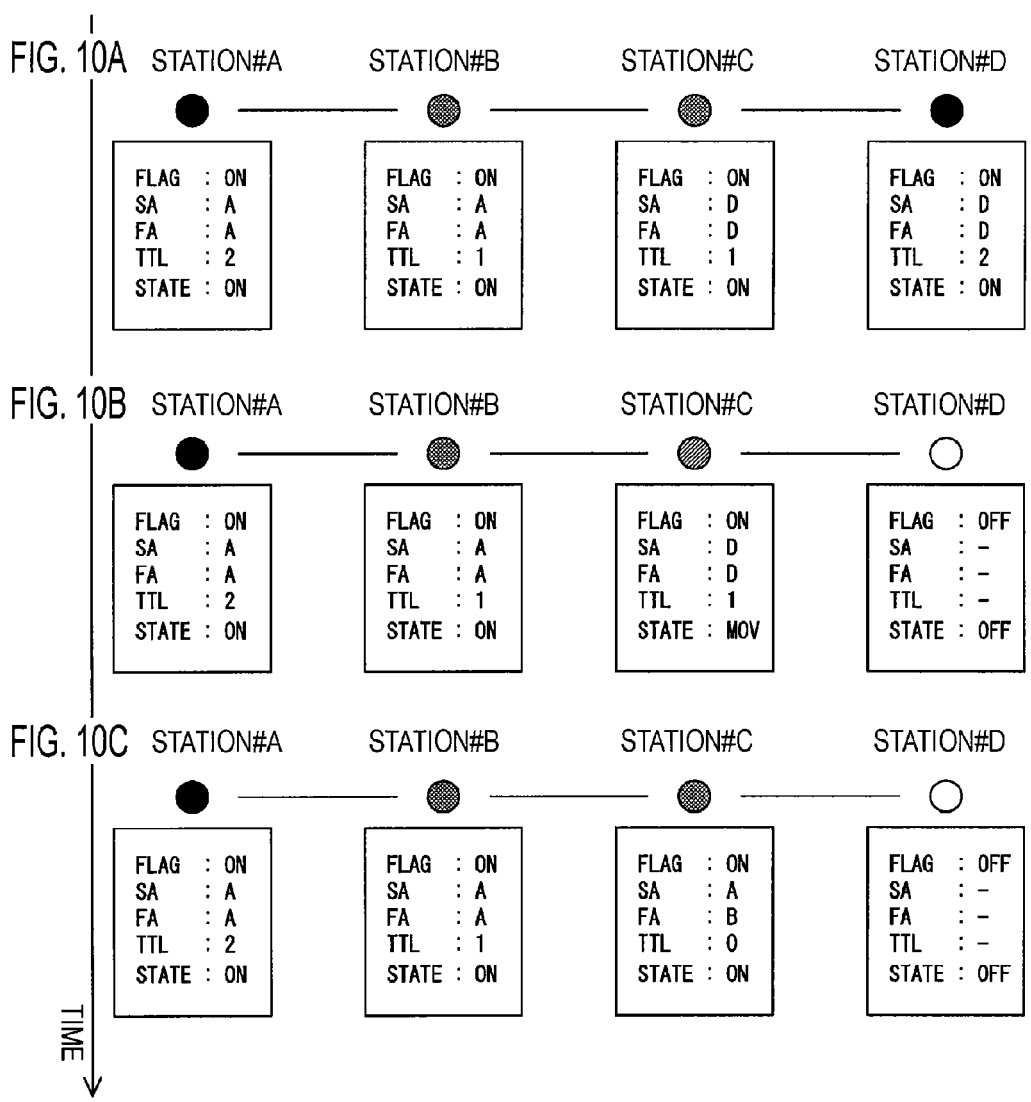

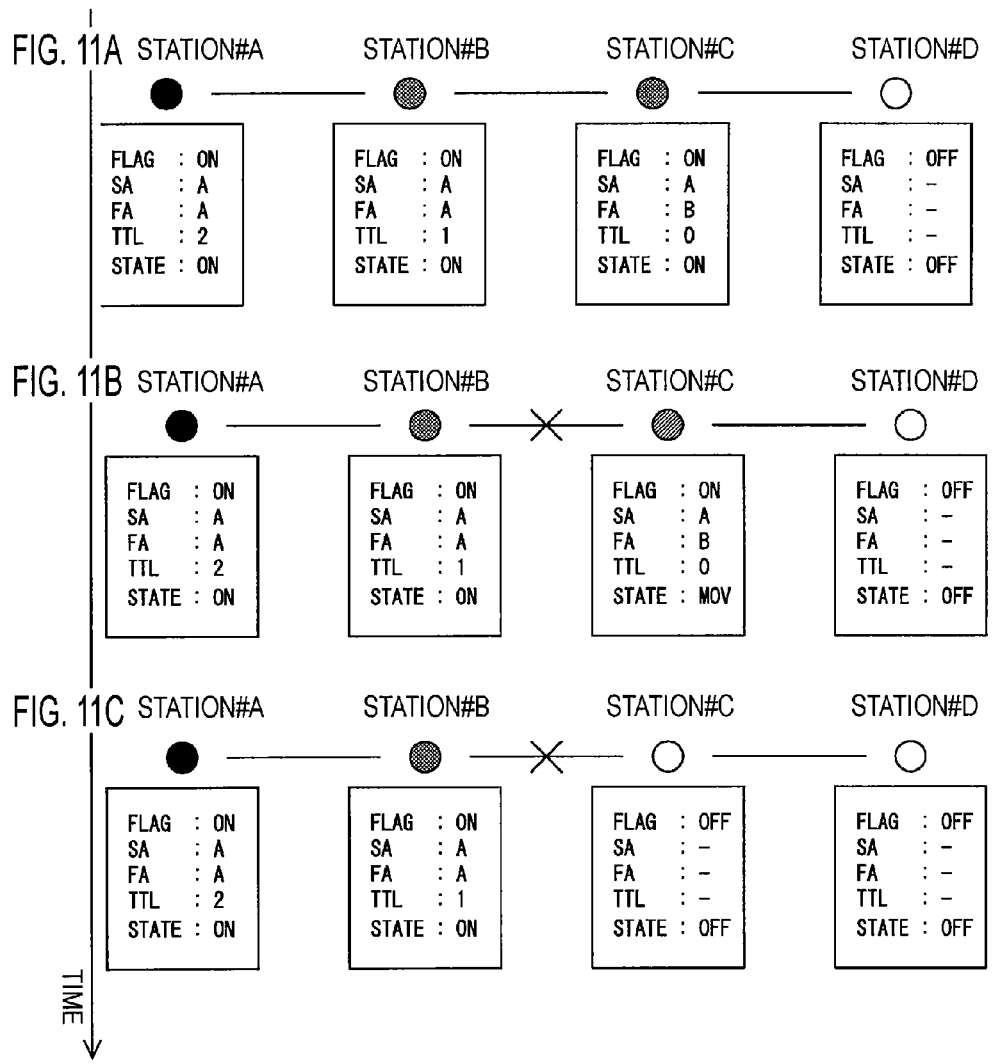

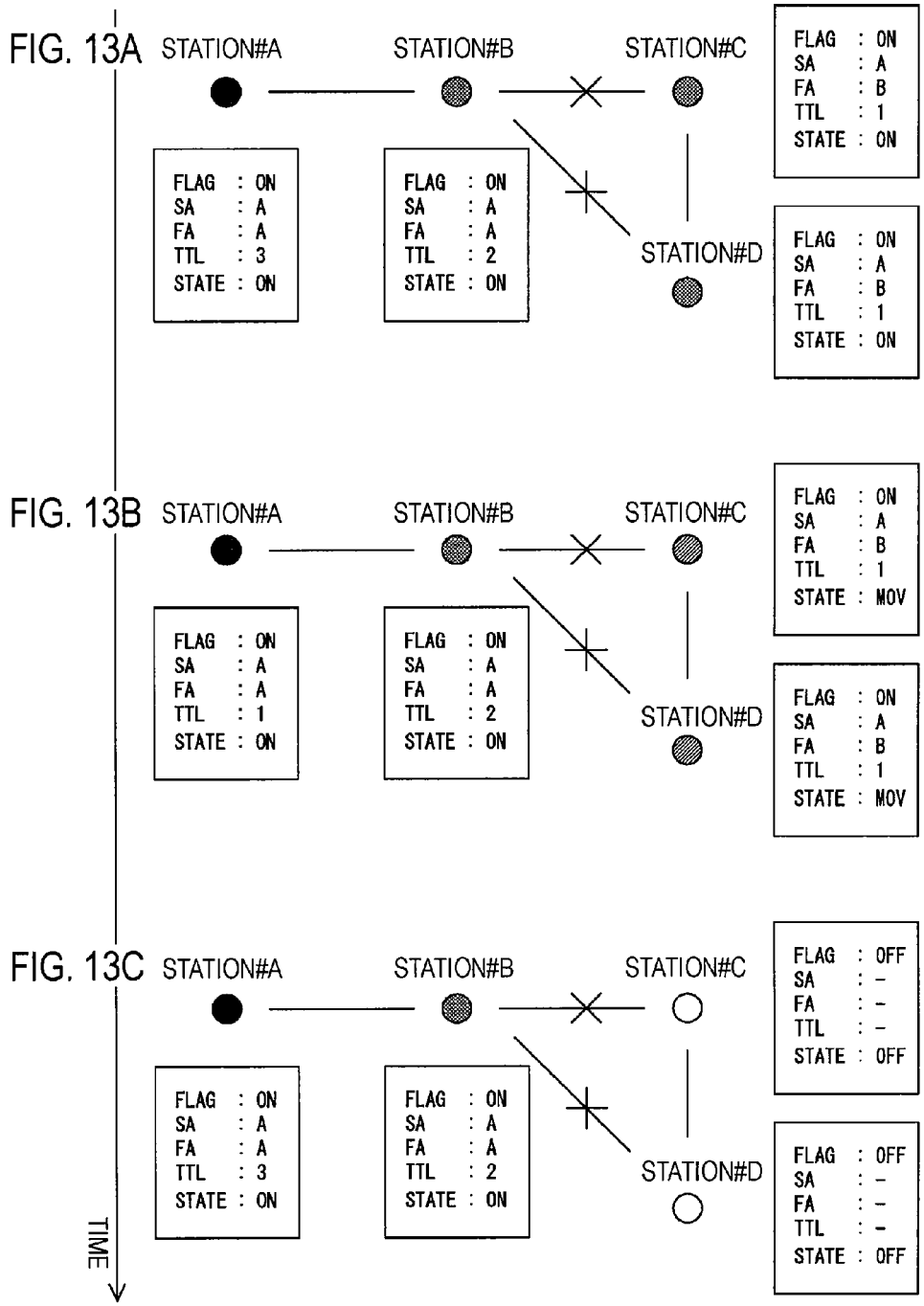

WIRELESS COMMUNICATION DEVICE AND CONTROL METHOD FOR THE DEVICE

CROSS REFERENCES TO RELATED APPLICATIONS

The present application claims priority to Japanese Patent Application JP 2005-139172 filed in the Japanese Patent Office on May 11, 2005, the entire contents of which are incorporated herein by reference.

BACKGROUND

The present application relates to wireless communication devices. More particularly, the present application relates to a wireless communication device capable of controlling switching of power modes, a method of controlling the switching of the power modes, and a program causing a computer to perform the method.

Wireless communication devices, typified by ones conforming to IEEE 802.11 and ones employing Bluetooth, have been mounted on many mobile devices in these days and it becomes important to save power in the wireless communication devices. Many existing wireless communication devices have an intermittent mode (also referred to as a power save mode), in addition to a normal mode in which the transmission and reception is constantly enabled, as power modes. The intermittent mode intermittently has a state in which no transmission and reception is performed in order to reduce the power consumption. However, although the intermnittent mode contributes to reduction in power consumption, access control in the intermittent mode is complicated because it is necessary to switch the states of the transmission and reception operation while keeping the consistency of the transmission and reception timings between the wireless communication devices. In addition, a communication delay possibly occurs due to the intermittent mode in real-time communication, for example, in audio communication or stream communication.

In a typical infrastructure network, such as a basic service set (BSS), in which a point coordinator (control station) is provided to achieve centralized control of communication, the point coordinator centrally manages the states of the transmission and reception operations of other wireless communication devices (stations) to realize the intermittent mode while keeping the consistency of the transmission and reception timings between the point coordinator and the other wireless communication devices. For example, a wireless communication system in which a point coordinator transmits an invocation instructing signal to each station to cancel a sleep state of the station is proposed in, for example, Japanese Unexamined Patent Application Publication No. 11-266254 (FIG. 9).

In contrast, in autonomous decentralized wireless networks, it is necessary to perform the access control in consideration of the states of transmission and reception operations of neighbor wireless communication devices (neighbor stations) when each terminal (including the point coordinator) autonomously switches the states of the transmission and reception operations. The autonomous decentralized wireless networks include ad hoc networks in which terminals (wireless communication devices) perform autonomous decentralized communication without an intervening point coordinator and networks, such as extended service sets (ESSs) including wireless distribution systems (WDSs), in which point coordinators are connected to each other by wireless communication. For example, each terminal communicates with a neighbor station while determining (1) whether the destination terminal is in the normal mode or in the intermittent mode, (2) the state of the transmission and reception operation if the destination terminal is in the intermittent mode, and (3) whether it is necessary to submit a request for switching from the intermittent mode to the normal mode to the destination terminal. Accordingly, it is necessary for each terminal to hold information concerning the states of transmission and reception operations of all the neighbor stations in the autonomous decentralized wireless networks. Consequently, the access control in each terminal is complicated in the autonomous decentralized wireless networks, compared with the infrastructure networks in which it is sufficient for each terminal to acquire information concerning the point coordinator.

In particular, the intermittent mode in the autonomous decentralized wireless networks possibly has a great effect on transmission and reception of broadcast packets. In the transmission of the broadcast packets, it is necessary for all the terminals, serving as the neighbor stations, to be in a reception enabled state. Since each terminal autonomously switches the states of transmission and reception operation, it is necessary to determine timings at which the broadcast packets are to be transmitted. In order to resolve this problem, for example, a common time segment in which all the terminals are in a transmission-reception enabled state is set in advance or the broadcast packets are expanded into unicast packets that are transmitted at timings at which the destination terminals are moved to the reception enabled state.

However, in the former case, since the terminals simultaneously attempt to transmit the broadcast packets in the time segment and the broadcast packets are not generally re-transmitted, the number of non-transmitted broadcast packets possibly increases.

In the latter case, since the broadcast packets are transmitted only to the terminals determined as the neighbor stations, it is necessary for each terminal to hold information concerning the transmission and reception states of all the neighbor stations. In addition, when a mesh network, typified by a sensor network, is built by using a multi-hop technology, the neighbor stations should normally receive the broadcast packets distributed by flooding, such as route request (RREG) packets used for searching for a route from the transmission station to the reception station, at the same timing. However, a large delay occurs in the time when the RREG packets are received depending on the timings of the transmission of the unicast packets and the delay can result in formation of an unexpected route. Furthermore, since it is necessary to transmit and receive the unicast packets of a number corresponding to the number of the neighbor stations, instead of one broadcast packet, the effective utilization ratio of channels is possibly reduced as the neighbor stations is increased in number.

It is desirable to perform forced switching of power modes of neighbor wireless communication devices in an autonomous decentralized wireless network.

SUMMARY

According to an embodiment, there is provided a wireless communication device communicating with a destination device outside a communication range of the own device thorough at least one relay station. The wireless communication device includes power mode controlling means for performing saving control of power supplied to the own device; forcing information holding means for holding forcing information including a forced mode flag indicating whether a forced operation instruction concerning the power saving control is enabled or disabled and a limited number of the relay stations; forcing information transmitting means for transmitting the forcing information to another wireless communication device within the communication range of the own device; and forcing-information update controlling means for updating the forcing information. With this structure, it is possible to transmit the forcing information of the own device to instruct another wireless communication device to perform the forced operation. Since the number of the relay stations is limited, the forcing information may be unicasted or broadcasted.

The power mode control means may perform forced switching to a power mode in which reception is enabled if the forced operation instruction indicated by the forced mode flag is enabled. In this case, it is possible to forcedly switch the power modes of other wireless communication devices. The power mode control means is allowed not to switch to the power mode in which reception is enabled even with the forced operation instruction indicated by the forced mode flag being enabled, if the switching to the power mode in which reception is enabled is prohibited. In this case, the present invention is applicable to a case where the moving to the forced mode is prohibited for any reason, for example, in a case where the own station is driven by a battery and it is difficult to perform the constant transmission and reception operation for a long time.

The forcing information transmitting means may transmit the forcing information that is included in a beacon signal periodically broadcasted. In this case, it is possible to forcedly move other wireless communication devices to the state in which the transmission and reception is constantly enabled without increasing overhead, compared with a method using a dedicated control packet or the like.

According to another embodiment, there is provided a wireless communication device communicating with a destination device outside a communication range of the own device thorough at least one relay station. The wireless communication device includes power mode controlling means for performing saving control of power supplied to the own device; forcing information holding means for holding forcing information including a forced mode flag indicating whether a forced operation instruction concerning the power saving control is enabled or disabled and a limited number of the relay stations; forcing information transmitting means for transmitting the forcing information to another wireless communication device within the communication range of the own device; forcing information receiving means for receiving the forcing information in the other wireless communication device from the other wireless communication device; and forcing-information update controlling means for updating the forcing information held in the forcing information holding means on the basis of a result of comparison between the forcing information held in the forcing information holding means and the forcing information in the other wireless communication device. With this structure, it is possible to transmit the forcing information of the own device to instruct another wireless communication device to perform the forced operation, and it is possible to update the forcing information of the own device on the basis of the forcing information received from the other wireless communication device.

The forcing-information update controlling means may include reception updating means for updating the forcing information held in the forcing information holding means on the basis of the forcing information in the other wireless communication device if a predetermined condition is satisfied. With this structure, it is possible to update the forcing information of the own device under the predetermined condition on the basis of the forcing information received from another wireless communication device.

The forcing information held in the forcing information holding means may further include, as the state of the forcing information, any of a first state in which the enablement of the forced operation instruction is indicated by the forced mode flag, a second state in which the disablement of the forced operation instruction is indicated by the forced mode flag, and a third state in transition from the first state to the second state. The reception updating means may update the forcing information held in the forcing information holding means on the basis of the forcing information in the other wireless communication device under a predetermined condition, if the forcing information in the other wireless communication device is in the first state. In this case, the wireless communication device assumes that the reception request is submitted if the forcing information in another wireless communication device is in the first state, and updates the forcing information of the own device.

The reception updating means may change the state of the forcing information held in the forcing information holding means to the third state under a predetermined condition if the forcing information held in the forcing information holding means is in the first state and the forcing information in the other wireless communication device is in the second state. In this case, the wireless communication device assumes that cancel of the reception request is requested if the forcing information in another wireless communication device is in the second state, and updates the forcing information of the own device.

The forcing-information update controlling means may further include periodic update means for updating the forcing information held in the forcing information holding means under a predetermined condition, if the forcing information held in the forcing information holding means is not updated by the reception updating means for a predetermined time. With this structure, it is possible to detect a timeout, meaning that the forcing information of the own device is not updated for a predetermined time.

The forcing information held in the forcing information holding means may further include, as the state of the forcing information, any of a first state in which the enablement of the forced operation instruction is indicated by the forced mode flag, a second state in which the disablement of the forced operation instruction is indicated by the forced mode flag, and a third state in transition from the first state to the second state. The periodic update means may change the state of the forcing information held in the forcing information holding means to the third state if the forcing information held in the forcing information holding means is in the first state and the state of the forcing information is not updated for a predetermined time, and may change the state of the forcing information held in the forcing information holding means to the second state if the forcing information held in the forcing information holding means is in the third state and the state of the forcing information is not updated for the predetermined time. In other words, if the wireless communication device detects a timeout meaning that the forcing information of the own device is not updated for a predetermined time, the first state is changed to the third state or the third state is changed to the second state.

According to another embodiment, there is provided a control method for a wireless communication device communicating with a destination device outside a communication range of the own device thorough at least one relay station. The wireless communication device includes power mode controlling means for performing saving control of power supplied to the own device and forcing information holding means for holding forcing information including a forced mode flag indicating whether a forced operation instruction concerning the power saving control is enabled or disabled and a limited number of the relay stations. The method includes the steps of receiving the forcing information in another wireless communication device within the communication range of the own device from the other wireless communication device; updating the forcing information held in the forcing information holding means on the basis of a result of comparison between the forcing information held in the forcing information holding means and the forcing information in the other wireless communication device; and transmitting the updated forcing information to the other wireless communication device.

According to an embodiment, there is provided a computer-readable program stored in a wireless communication device communicating with a destination device outside a communication range of the own device thorough at least one relay station. The wireless communication device includes power mode controlling means for performing saving control of power supplied to the own device and forcing information holding means for holding forcing information including a forced mode flag indicating whether a forced operation instruction concerning the power saving control is enabled or disabled and a limited number of the relay stations. The program causes a computer to execute instructions for receiving the forcing information in another wireless communication device within the communication range of the own device from the other wireless communication device; instructions for updating the forcing information held in the forcing information holding means on the basis of a result of comparison between the forcing information held in the forcing information holding means and the forcing information in the other wireless communication device; and instructions for transmitting the updated forcing information to the other wireless communication device.

According to embodiment of the present invention, it is possible to forcedly switch the power modes of neighbor wireless communication devices in an autonomous decentralized wireless network.

Additional features and advantages are described herein, and will be apparent from, the following Detailed Description and the figures.

BRIEF DESCRIPTION OF THE FIGURES

FIGS. 7A to 7D illustrate a first update example of a current parameter table according to an embodiment;

FIGS. 8A to 8D illustrate a second update example of the current parameter table according to an embodiment;

FIGS. 9A to 9D illustrate a third update example of the current parameter table according to an embodiment;

FIGS. 10A to 10C illustrate a fourth update example of the current parameter table according to an embodiment;

FIGS. 11A to 11C illustrate a fifth update example of the current parameter table according to an embodiment;

FIGS. 13A to 13C illustrate a seventh update example of the current parameter table according to an embodiment;

DETAILED DESCRIPTION

Embodiments of the present invention will be described in detail with reference to the attached drawings.

Figure 1:
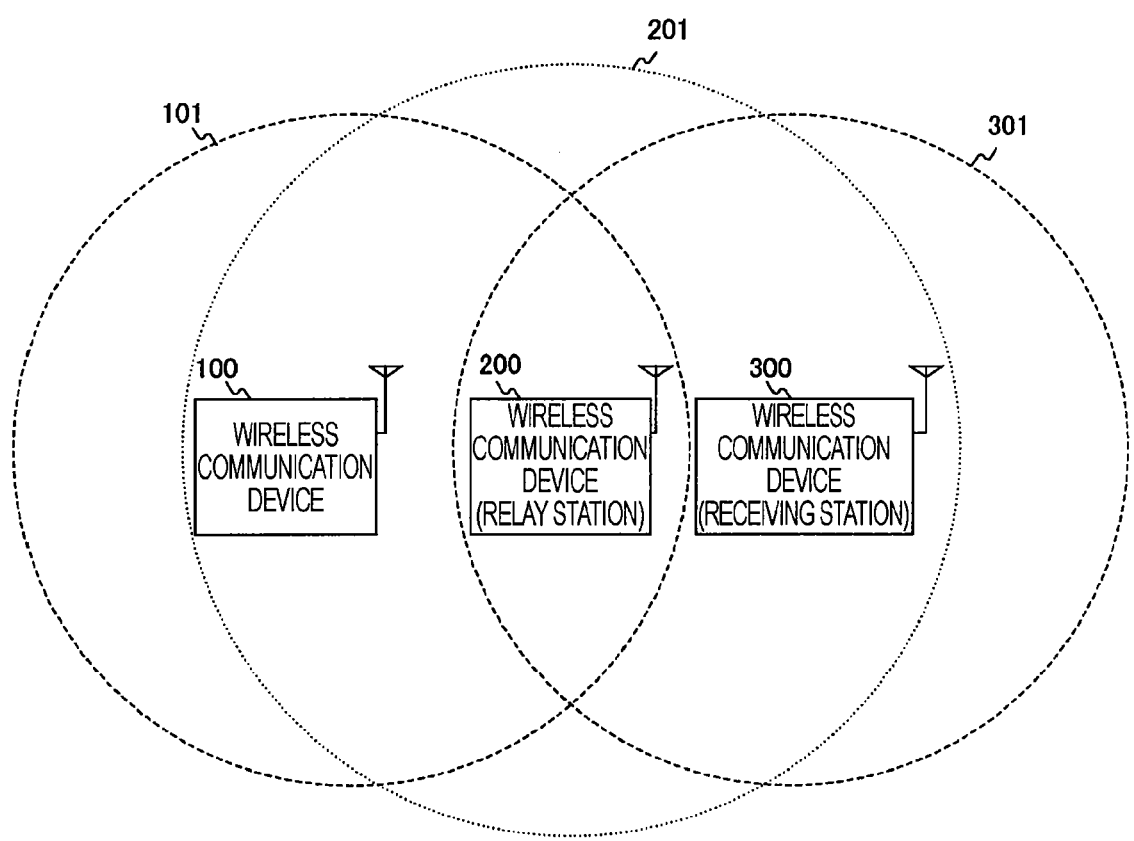
FIG. 1 is a schematic view of an autonomous decentralized wireless network according to an embodiment.

FIG. 1 is a schematic view of an autonomous decentralized wireless network according to an embodiment. This wireless network includes wireless communication devices 100, 200, and 300 that autonomously operate to form the network by wireless communication. The wireless network has no point coordinator, unlike an infrastructure network.

When the wireless communication device 100 transmits a packet to the wireless communication device 300 in the example in FIG. 1, it is not possible for the wireless communication device 100 to directly perform the wireless communication with the wireless communication device 300 because the wireless communication device 100 is outside a communication range 301 of the wireless communication device 300 and the wireless communication device 300 is outside a communication range 101 of the wireless communication device 100. Accordingly, the wireless communication device 200 including the wireless communication devices 100 and 300 in its communication range 201 serves as a relay station to receive the packet from the wireless communication device 100 and to transmit the packet to the wireless communication device 300, which is the receiving station. In an autonomous decentralized wireless network, the wireless communication device can communicate with a receiving station outside the communication range through another wireless communication device serving as a relay station, as described above.

Although one wireless communication device serves as the relay station in the example in FIG. 1, two or more relay stations may be provided in the autonomous decentralized wireless network. In addition, although the wireless communication device 100 is exemplified in the following description, the wireless communication devices 200 and 300 have the same structure as the wireless communication device 100.

Figure 2:
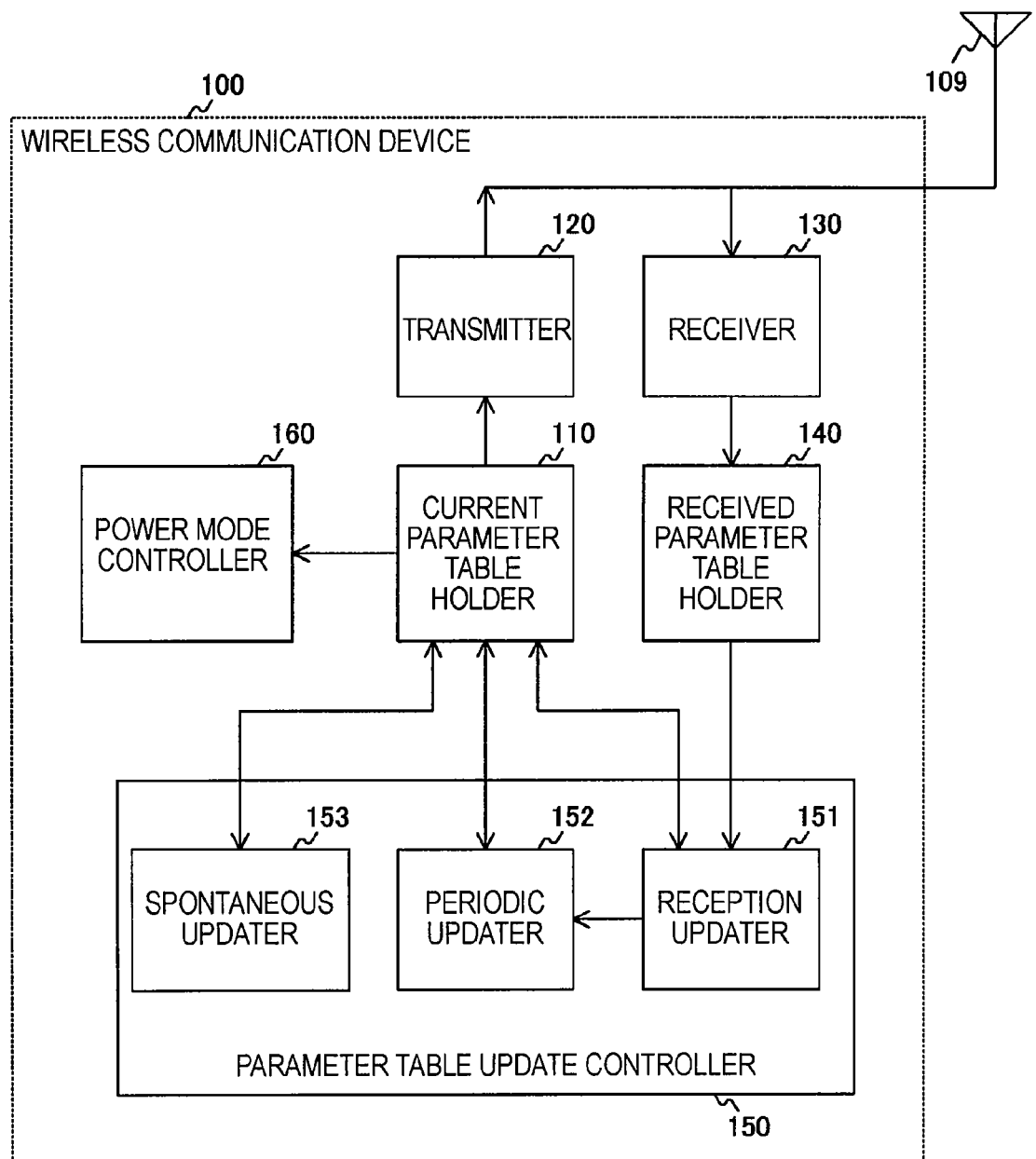
FIG. 2 is a block diagram showing an example of the structure of a wireless communication device according to an embodiment.

FIG. 2 is a block diagram showing an example of the structure of the wireless communication device 100 according to an embodiment. The wireless communication device 100 includes a current parameter table holder 110, a transmitter 120, a receiver 130, a received parameter table holder 140, a parameter table update controller 150, and a power mode controller 160.

The current parameter table holder 110 holds information used for forced switching of power modes in the wireless communication device 100 in a parameter table. The content of the parameter table will be described below.

The transmitter 120 transmits the parameter table held in the current parameter table holder 110. The transmitter 120 may unicast or broadcast the parameter table. Alternatively, the transmitter 120 may transmit the parameter table that is embedded in a beacon signal periodically broadcasted.

The receiver 130 receives the parameter table from another wireless communication device. The receiver 130 may receive the parameter table that is unicasted or may receive the parameter table that is broadcasted. Alternatively, the receiver 130 may extract the parameter table that is embedded in a beacon signal. The transmitter 120 and the receiver 130 perform the wireless communication with other wireless communication devices via an antenna 109, which is connected to the transmitter 120 and the receiver 130.

The received parameter table holder 140 holds the parameter table of the other wireless communication device, received by the receiver 130. The parameter table held in the received parameter table holder 140 is overwritten each time the receiver 130 receives a new parameter table.

The parameter table update controller 150 updates the current parameter table on the basis of a result of comparison between the parameter table held in the current parameter table holder 110 (hereinafter referred to as a current parameter table) and the parameter table held in the received parameter table holder 140 (hereinafter referred to as a received parameter table).

The parameter table update controller 150 includes a reception updater 151, a periodic updater 152, and a spontaneous updater 153. The reception updater 151 determines whether the current parameter table is to be updated each time a new received parameter table is received and updates the current parameter table, if necessary. The periodic updater 152 periodically determines whether the update by the reception updater 151 is not performed for a predetermined time and changes the content of the current parameter table, if necessary. The spontaneous updater 153 updates the current parameter table when the wireless communication device 100 instructs another wireless communication device to perform the forced switching of the power modes or instructs another wireless communication device to cancel the forced switching of the power modes. A request for reception, submitted after the spontaneous updater 153 in the wireless communication device 100 instructs another wireless communication device to perform the forced switching of the power modes, is called a reception request.

The power mode controller 160 controls the power modes of a power supply of the wireless communication device 100. The power modes generally include a normal mode in which the transmission and reception is constantly enabled and an intermittent mode intermittently having a state in which no transmission and reception is performed in order to reduce the power consumption. According to the embodiment, a forced mode is further provided in which the wireless communication device 100 is forced into a state in which the transmission and reception operation is enabled, irrespective of the normal mode or the intermittent mode. The power mode controller 160 sets or cancels the forced mode in accordance with the content of the current parameter table.

Figure 3:
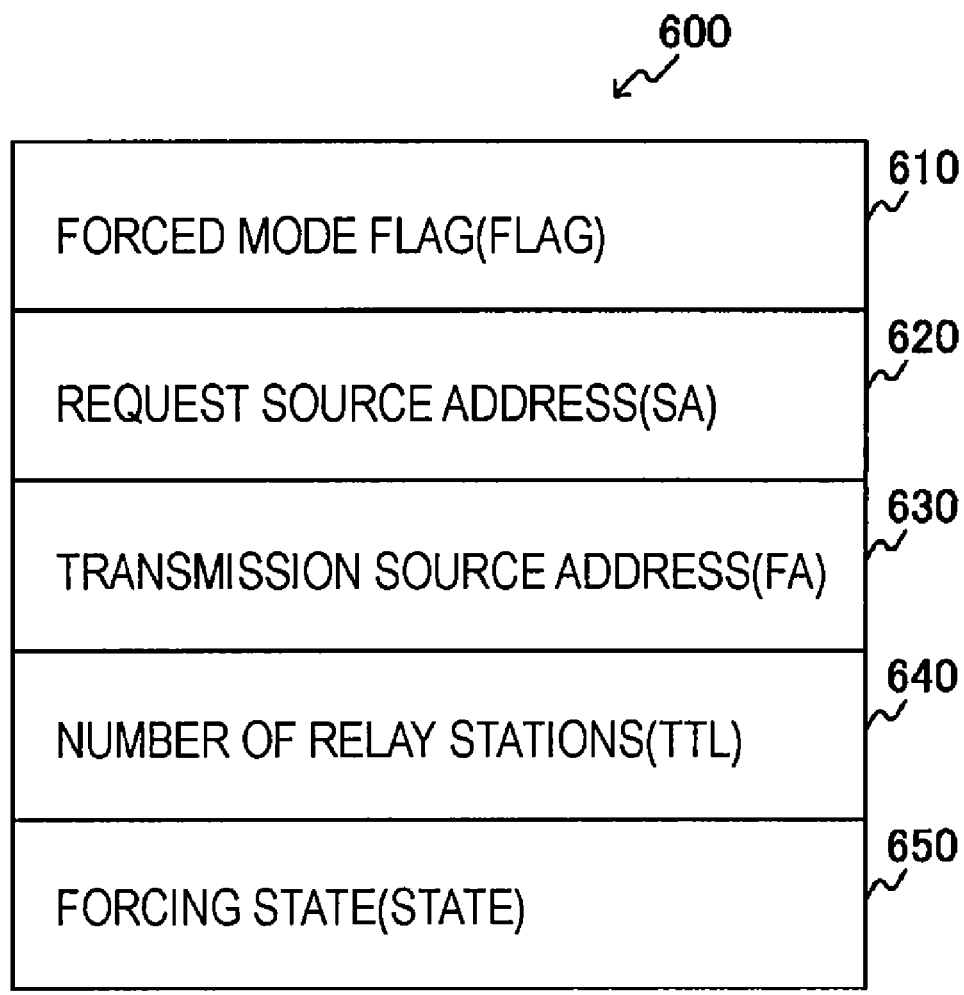
FIG. 3 shows an example of the structure of a parameter table according to an embodiment.

FIG. 3 shows an example of the structure of a parameter table 600 according to an embodiment. The parameter table 600 is held in the current parameter table holder 110 and is received by the receiver 130. The parameter table 600 includes a forced mode flag 610, a request source address 620, a transmission source address 630, a number of relay stations 640, and a forcing state 650.

The forced mode flag 610 indicates whether the forced mode is set as the power mode of the wireless communication device holding the current parameter table. Specifically, the forced mode flag 610 is set to "enabled" ("ON": the forced mode is set) if the power mode controller 160 is instructed to be forced into the state in which transmission and reception operation is enabled, and the forced mode flag 610 is set to "disabled" "(OFF": the forced mode is canceled) if the power mode controller 160 is not instructed to be forced into the state. The forced mode flag 610 is denoted by "FLAG" in the following drawings for simplicity.

The request source address 620 identifies a wireless communication device that has initially transmitted the parameter table. Since there is a case in which the wireless communication with a wireless communication device outside the communication range is performed via another wireless communication device in the autonomous decentralized wireless network, the request source address 620 is used to identify a wireless communication device that has initially generated and transmitted the parameter table. For example, a media access control (MAC) address or an identifier (ID) unique to each wireless communication device is specified as the request source address 620. The request source address 620 is denoted by "Source Address (SA)" in the following drawings for simplicity.

The transmission source address 630 identifies a wireless communication device that has most recently transmitted the parameter table. The transmission source address 630 is used to identify a wireless communication device that is the source of the final transmission, irrespective of the wireless communication device that has initially transmitted the parameter table. Like the request source address 620, for example, an MAC address or an ID unique to each wireless communication device is specified as the transmission source address 630. The transmission source address 630 is denoted by "From Address (FA)" in the following drawings for simplicity.

The number of relay stations 640 indicates a limited number of relay stations when the parameter table is transmitted through other wireless communication devices serving as the relay stations. Since the number of relay stations 640 is decreased each time the parameter table passes through the wireless communication device, the parameter table is controlled so as not to be further transmitted through other wireless communication devices serving as the relay stations if the number of relay stations 640 becomes zero. The number of relay stations 640 is denoted by "Time To Live (TTL)" in the following drawings for simplicity.

The forcing state 650 indicates a state of the parameter table. The forcing state 650 is set to a forcing enabled state, a forcing disabled state, or a transition state. These states will be described below with reference to FIG. 4. The forcing state 650 is denoted by "STATE" in the following drawings for simplicity.

Figure 4:
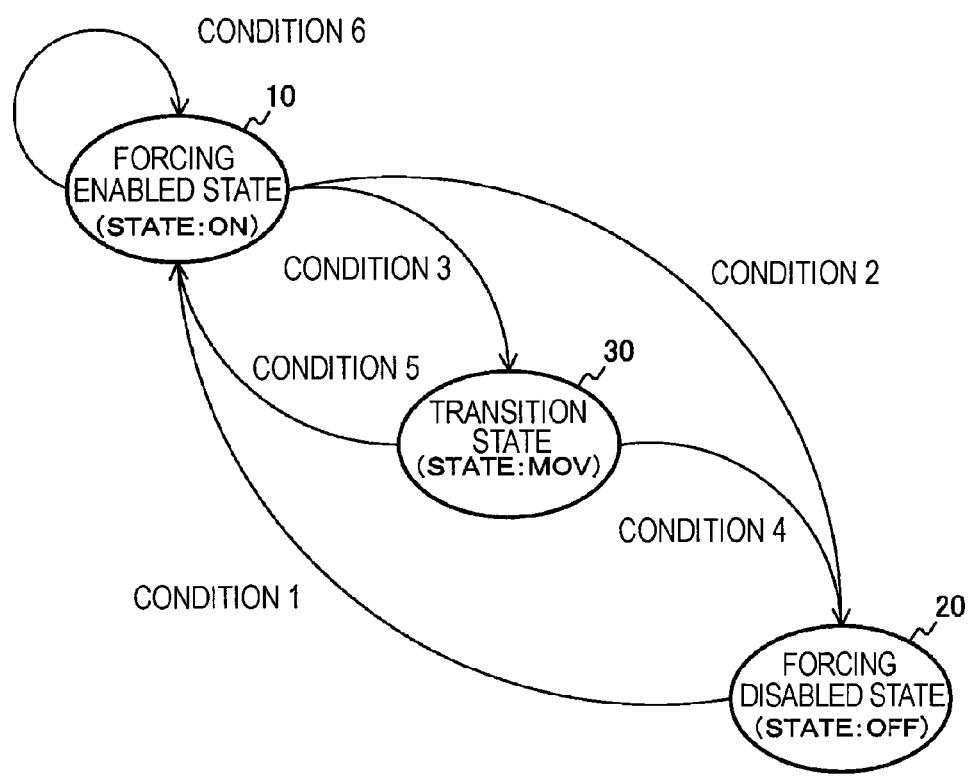
FIG. 4 shows an example of state transition of a forcing state according to an embodiment.

FIG. 4 shows an example of state transition of the forcing state 650 according to an embodiment. The forcing state 650 in the parameter table is set to a forcing enabled state 10, a forcing disabled state 20, or a transition state 30.

In the forcing enabled state 10, the forced mode flag 610 is set to "enabled". Specifically, the wireless communication device submits the reception request or the wireless communication device receives the reception request from another wireless communication device in the forcing enabled state 10. The forcing enabled state 10 is denoted by "STATE: ON" in the following drawings for simplicity.

In the forcing disabled state 20, the forced mode flag 610 is set to "disabled". Specifically, the wireless communication device does not submit the reception request and the wireless communication device does not receive the reception request from another wireless communication device in the forcing disabled state 20. The forcing disabled state 20 is denoted by "STATE: OFF" in the following drawings for simplicity.

The transition state 30 is a state through which the forcing enabled state 10 is moved to the forcing disabled state 20. The forced mode flag 610 is set to "enabled" also in the transition state 30. The provision of the transition state 30 allows suppression of frequent switching of the forced mode flag 610 in a propagation path having a larger packet loss and allows easy support for multiple wireless communication devices that submit the reception requests. The transition state 30 is denoted by "STATE: MOV" in the following drawings for simplicity.

The above states are changed in a manner described below. When the wireless communication device submits the reception request or receives the reception request from another wireless communication device in the forcing disabled state 20, the forcing state 650 is moved to the forcing enabled state 10 (a condition 1). When the wireless communication device cancels the reception request in the forcing enabled state 10, the forcing state 650 is moved to the forcing disabled state 20 (a condition 2). When the reception request received from another wireless communication device is explicitly canceled in the forcing enabled state 10 or the reception request is not received for a predetermined time after the cancel (timeout), the forcing state 650 is moved to the transition state 30 (a condition 3).

When the reception request is not received for the predetermined time and the wireless communication device does not submit the reception request in the transition state 30, the forcing state 650 is moved to the forcing disabled state 20 (a condition 4). In contrast, when the reception request is received again or is newly received within the predetermined time or the wireless communication device submits the reception request again or newly in the transition state 30, the forcing state 650 is moved to the forcing enabled state 10 (a condition 5).

When the current parameter table has been updated within the predetermined time in the forcing enabled state 10, the forcing state 650 remains in the forcing enabled state 10 (a condition 6). For example, the condition 6 applies to a case in which the wireless communication device submits the reception request while receiving the reception request from another wireless communication device, a case in which the number of relay stations 640 is changed due to a change in network topology, and a case in which a parameter table having a priority higher than that of the current parameter table is received. The priority will be described in detail below.

Figure 5A:
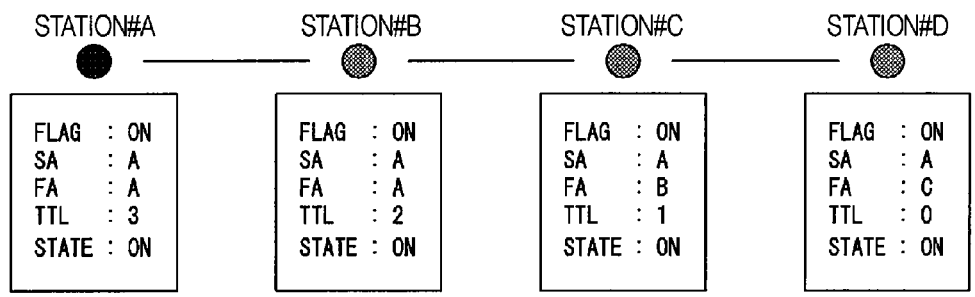
FIGS. 5A and 5B illustrate the priority of the parameter table according to an embodiment.
Figure 5B:
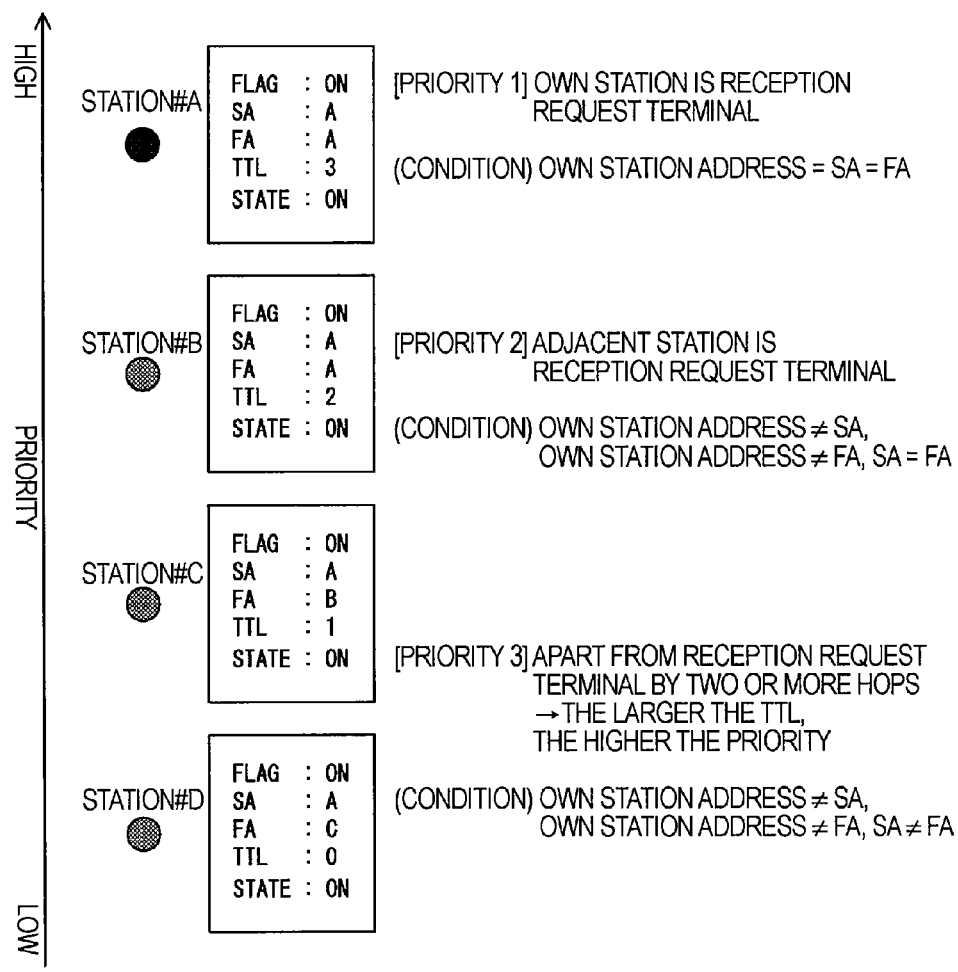

FIGS. 5A and 5B illustrate the priority of the parameter table 600 according to an embodiment of the present invention. FIG. 5A shows an example of the content of the current parameter tables of stations #A to #D when the station #A submits the reception request. According to the embodiment, the priority of the parameter table is decreased as the distance from the station #A submitting the reception request is increased.

As shown in FIG. 5B, the terminal (station) submitting the reception request has "priority 1", which is the highest priority. In this case, both the request source address (SA) and the transmission source address (FA) coincide with the own address.

The terminal whose adjacent station submits the reception request has "priority 2", which is the second highest priority. In this case, although the request source address (SA) coincides with the transmission source address (FA), the request source address (SA) and the transmission source address (FA) do not coincide with the own address.

The priority of terminals having a priority other than the "priority 1" and the "priority 2" is set as "priority 3". The dominance of the parameter tables having the "priority 3" is determined on the basis of the number of relay stations 640. That is, among the parameter tables having the "priority 3", the larger the number of relay stations 640, the higher the priority.

Accordingly, in the example shown in FIG. 5B, the station #A has the "priority 1" and the station #B has the "priority 2". Although both the station #C and the station #D have the "priority 3", the station #C having the number of relay stations 640 larger than that of the station #D is given priority over the station #D.

FIGS. 6A to 6D illustrate an occurrence of loopback according to an embodiment. If the current parameter table is unconditionally updated on the assumption of the above state transition, the loopback possibly occurs depending on the timings of the update.

Figure 6A:
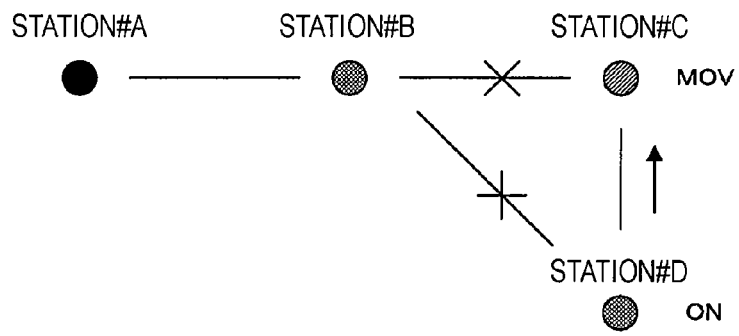
FIGS. 6A to 6D illustrate an occurrence of loopback according to an embodiment.
Figure 6B:
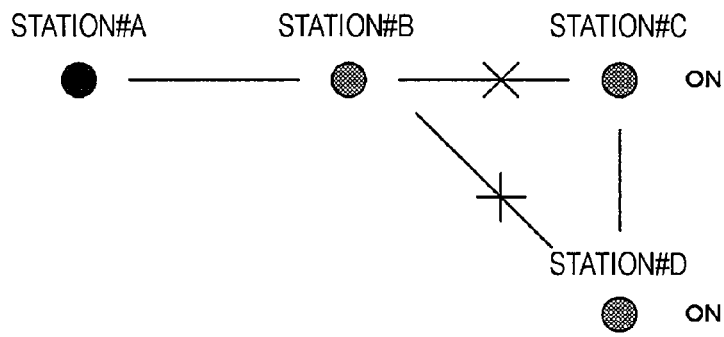

It is assumed that the communication between the stations #B and #C and the communication between the stations #B and #D are cut off after the station #A submits the reception request to cause the states of the stations #B to #D to be in the forcing enabled state 10. If the parameter table having the forced mode flag 610 being set to "enabled" is transmitted from the station #D to the station #C when only the station #C is moved to the transition state 30 due to a shift in transition timing (FIG. 6A), the station #C goes back to the forcing enabled state 10 (FIG. 6B).

Figure 6C:
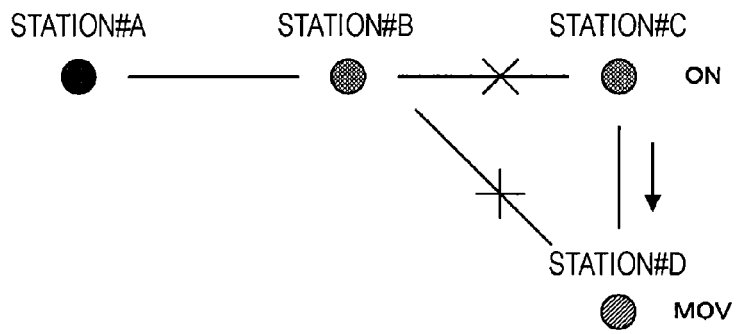
Figure 6D:
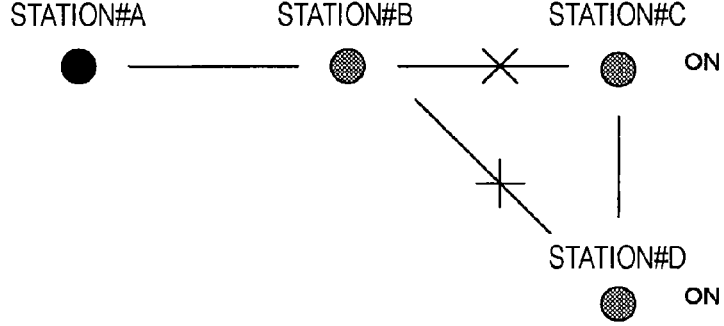

If the station #D is subsequently moved to the transition state 30, the parameter table having the forced mode flag 610 being set to "enabled" is transmitted from the station #C to the station #D (FIG. 6C). In response to the transmission of the parameter table, the station #D goes back to the forcing enabled state 10 (FIG. 6D).

As described above, the phenomenon in which the stations that should be moved to the forcing disabled state 20 are moved between the forcing enabled state 10 and the transition state 30 due to shifts in the transition timing is called the loopback. According to the embodiment of the present invention, in order to prevent the loopback, the following criteria is set for the condition (the condition 5 in FIG. 4) in which the station is moved from the transition state 30 to the forcing enabled state 10.

Specifically, the request source address (SA) of the current parameter table is compared with the request source address (SA) of the received parameter table. If the request source address (SA) of the current parameter table is different from the request source address (SA) of the received parameter table, the current parameter table is updated on the basis of the received parameter table. If the request source address (SA) of the current parameter table coincides with the request source address (SA) of the received parameter table, the priority of the current parameter table is compared with the priority of the received parameter table. Only if the priority of the current parameter table is lower than the priority of the received parameter table, the current parameter table is updated on the basis of the received parameter table.

Update examples of the current parameter table of the wireless communication device, according to embodiments, will be described.

FIGS. 7A to 7D illustrate a first update example of the current parameter table according to an embodiment. Referring to FIGS. 7A to 7D, the stations connected by lines perform the wireless communication with each other as the neighbor stations. Specifically, the wireless communication is achieved between the stations #A and #B, between the stations #B and #C, and between the stations #C and #D. The vertical axis represents time and the time proceeds from top to bottom. The same applies to update examples of the current parameter table, described below.

The current parameter tables of all the stations #A to #D are reset (FIG. 7A). That is, the forced mode flag 610 is set to "disabled" and the forcing state 650 is in the forcing disabled state 20 in accordance with the forced mode flag 610.

When the station #A submits the reception request, the forced mode flag 610 is set to "enabled", the forcing state 650 is moved to the forcing enabled state 10, both the request source address 620 and the transmission source address 630 coincide with the address of the station #A, and the number of relay stations 640 is set to two in the parameter table of the station #A (FIG. 7B). The station #A transmits the current parameter table to the neighbor station.

The station #B receives the parameter table from the station #A and updates the current parameter table on the basis of the received parameter table. Specifically, the forced mode flag 610 is set to "enabled" and the forcing state 650 is moved to the forcing enabled state 10 in the parameter table of the station #B. Both the request source address 620 and the transmission source address 630 coincide with the address of the station #A. The number of relay stations 640 is set to one given by subtracting one from two at the reception (FIG. 7C). The station #B transmits the current parameter table to the neighbor station.

The station #C receives the parameter table from the station #B and updates the current parameter table on the basis of the received parameter table. Specifically, the forced mode flag 610 is set to "enabled" and the forcing state 650 is moved to the forcing enabled state 10 in the parameter table of the station #C. The request source address 620 coincides with the address of the station #A and the transmission source address 630 coincides with the address of the station #B. The number of relay stations 640 is set to zero given by subtracting one from one at the reception (FIG. 7D). The station #C transmits the current parameter table to the neighbor station.

When the station #B broadcasts the current parameter table, the station #A also receives the parameter table. At this time, the station #A compares the priority of the current parameter table with the priority of the parameter table transmitted from the station #B. Since the priority of the current parameter table is higher than the priority of the parameter table transmitted from the station #B, the station #A does not update the current parameter table.

The station #D receives the parameter table from the station #C and does not update the current parameter table because the number of relay stations 640 is set to zero in the received parameter table (FIG. 7D).

FIGS. 8A to 8D illustrate a second update example of the current parameter table according to an embodiment of the present invention. In FIGS. 8A to 8D, the forcing states 650 in the stations #B and #C are moved to the forcing enabled state 10 because the station #A submits the reception request (FIG. 8A).

When the station #A cancels the reception request, the current parameter table of the station #A is reset to set the forced mode flag 610 to "disabled" and to change the forcing state 650 to the forcing disabled state 20 (FIG. 8B).

The station #B receives the parameter table from the station #A and updates the current parameter table on the basis of the received parameter table. Specifically, since the request source address 620 in the current parameter table coincides with the request source address 620 in the received parameter table and the forced mode flag 610 in the received parameter table is set to "disabled", the forcing state 650 in the current parameter table is moved to the transition state 30 (FIG. 8B). The station #B has not received the parameter table having the forced mode flag 610 being set to "enabled" from another station within the predetermined time. Accordingly, in the station #B, the forcing state 650 in the current parameter table is moved to the forcing disabled state 20 and the current parameter table is reset (FIG. 8C).

The station #C receives the parameter table from the station #B and updates the current parameter table in the same manner as in the station #B. The forcing state 650 is moved to the transition state 30 (FIG. 8C) and, then, is moved to the forcing disabled state 20 (FIG. 8D).

FIGS. 9A to 9D illustrate a third update example of the current parameter table according to an embodiment of the present invention. In this example, the current parameter tables of all the stations #A to #D are reset (FIG. 9A), as in FIG. 7A. After the station #A submits the reception request (FIG. 9B), the forcing states 650 in the stations #B and #C are moved to the forcing enabled state 10 (FIG. 9C).

When the station #D submits the reception request, the forced mode flag 610 is set to "enabled" and the forcing state 650 is moved to the forcing enabled state 10. The request source address 620 and the transmission source address 630 are set to the address of the station #D. The number of relay stations 640 is set to two (FIG. 9D).

The station #C receives the parameter table from the station #D and compares the priority of the received parameter table with the priority of the current parameter table. Since the priority of the received parameter table is higher than the priority of the current parameter table, the station #C updates the current parameter table on the basis of the received parameter table. The request source address 620 and the transmission source address 630 are set to the address of the station #D. The number of relay stations 640 is set to one given by subtracting one from two at the reception (FIG. 9D).

Although the station #B receives the parameter table from the station #C, the current parameter table of the station #B is not changed because the priority of the current parameter table of the station #B is higher than the priority of the received parameter table.

FIGS. 10A to 10C illustrate a fourth update example of the current parameter table according to an embodiment of the present invention. In this example, both the station #A and the station #D submit the reception requests (FIG. 10A).

If the station #D cancels the reception request, the current parameter table of the station #D is reset to set the forced mode flag 610 to "disabled" and to set the forcing state 650 to the forcing disabled state 20 (FIG. 10B).

In the station #C, which has received the parameter table from the station #D, the forcing state 650 is moved to the transition state 30 (FIG. 10B), as in the station #B in FIG. 8B. Then, the station #C receives the parameter table from the station #B, and updates the current parameter table on the basis of the received parameter table because the request source address 620 in the received parameter table is different from that in the current parameter table. Specifically, in the station #C, the forcing state 650 is set to the forcing enabled state 10. The request source address 620 is set to the address of the station #A and the transmission source address 630 is set to the address of the station #B. The number of relay stations 640 is set to zero given by subtracting one from one at the reception (FIG. 10C).

FIGS. 11A to 11C illustrate a fifth update example of the current parameter table according to an embodiment of the present invention. Since the station #A submits the reception request, as in FIG. 8A, the station #B and the station #C are moved to the forcing enabled state 10 (FIG. 11A).

It is assumed that the transmission and reception of packets between the stations #B and #C becomes disabled for any reason. As a result, the reception request transmitted from the station #B is not received by the station #C and the forcing state 650 of the station #C is moved to the transition state 30 after the predetermined time elapses (FIG. 11B).

Since the station #C does not receive the reception request from the station #B after another predetermined time elapses, the forcing state 650 of the station #C is moved to the forcing disabled state 20 and the current parameter table of the station #C is reset (FIG. 11C).

Figure 12A:
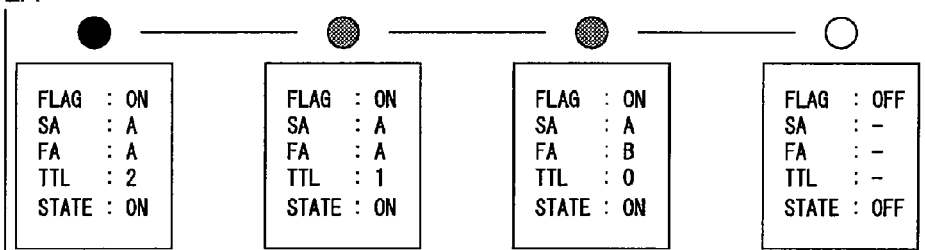
FIGS. 12A to 12D illustrate a sixth update example of the current parameter table according to an embodiment.
Figure 12B:
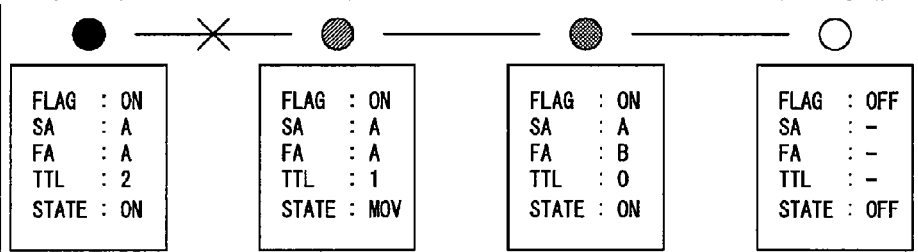
Figure 12C:
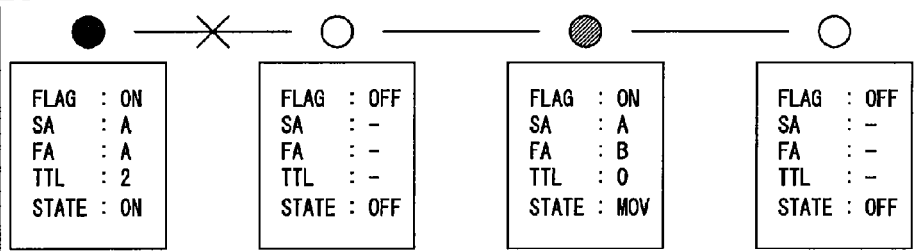

FIGS. 12A to 12C illustrate a sixth update example of the current parameter table according to an embodiment of the present invention. In this example, the station #A submits the reception request and the forcing states 650 of the stations #B and #C are moved to the forcing enabled state 10 (FIG. 12A), as in FIGS. 8A and 11A.

It is assumed that the transmission and reception of packets between the stations #A and #B becomes disabled for any reason. As a result, the reception request transmitted from the station #A is not received by the station #B and the forcing state 650 of the station #B is moved to the transition state 30 after the predetermined time elapses (FIG. 12B). Since the station #B does not receive the reception request from the station #A after another predetermined time elapses, the forcing state 650 of the station #B is moved to the forcing disabled state 20 and the current parameter table of the station #B is reset (FIG. 12C).

Figure 12D:
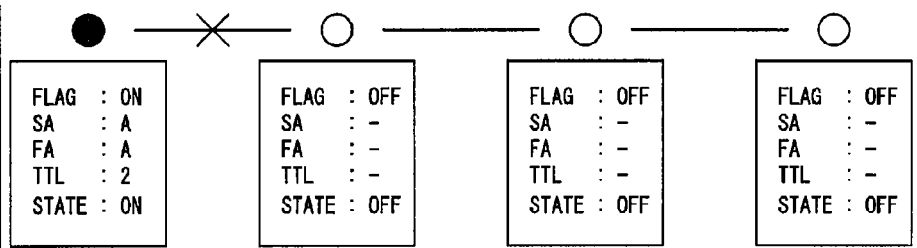

In the station #C, which has received the parameter table from the station #B, the forcing state 650 in the current parameter table is moved to the transition state 30 (FIG. 12C) because the forcing state 650 in the received parameter table is in the forcing disabled state 20. Since no reception request is received from any of the stations after the predetermined time elapses, the forcing state 650 of the station #C is moved to the forcing disabled state 20 and the current parameter table is reset (FIG. 12D).

FIGS. 13A to 13C illustrate a seventh update example of the current parameter table according to an embodiment. In this example, the stations #B to #D are located so as to perform the wireless communication with each other, unlike the above examples. It is assumed that the transmission and reception of packets between the stations #B and #C and between the stations #B and #D becomes disabled for any reason (FIG. 13A).

As a result, the reception request transmitted from the station #B is not received by the stations #C and #D and the forcing states 650 of the stations #C and #D are moved to the transition state 30 after the predetermined time elapses (FIG. 13B). Since the stations #C and #D do not receive the reception request from the station #B after another predetermined time elapses, the forcing states 650 of the stations #C and #D are moved to the forcing disabled state 20 and the current parameter tables of the stations #C and #D are reset (FIG. 13C).

Figure 14A:
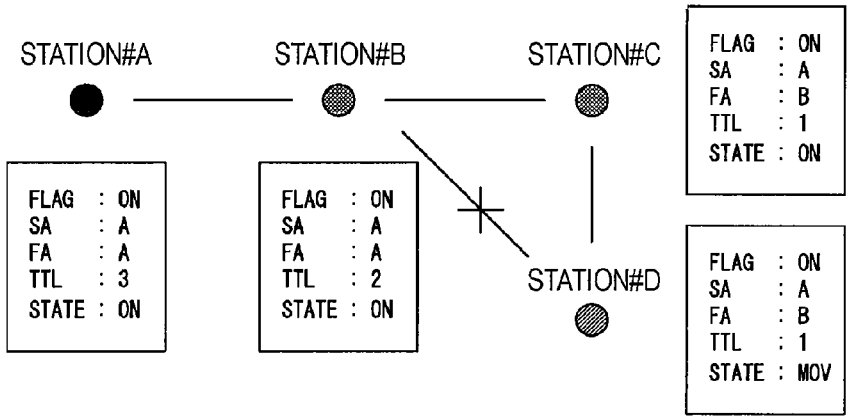
FIGS. 14A to 14C illustrate an eighth update example of the current parameter table according to an embodiment.
Figure 14B:
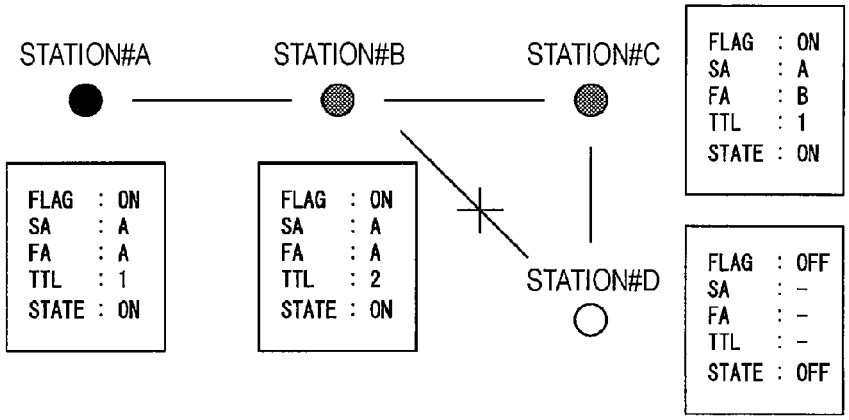
Figure 14C:
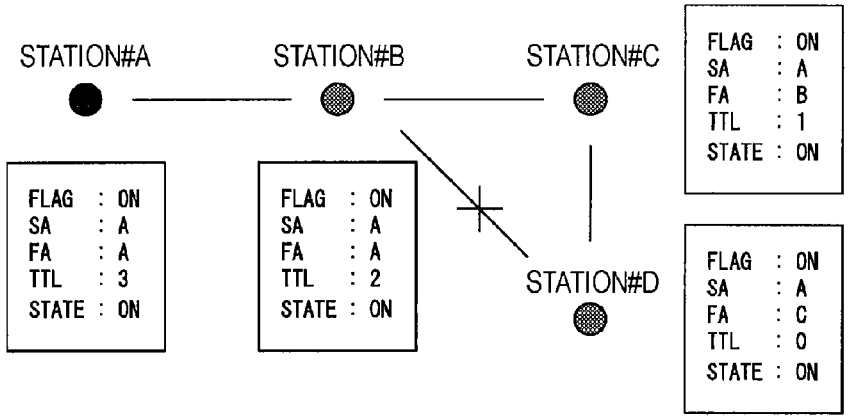

FIGS. 14A to 14C illustrate an eighth update example of the current parameter table according to an embodiment of the present invention. In this example, the stations #B to #D are located so as to perform the wireless communication with each other, as in FIG. 13A. It is assumed that the transmission and reception of packets between the stations #B and #D becomes disabled for any reason (FIG. 14A).

As a result, the reception request transmitted from the station #B is not received by the station #D and the forcing state 650 of the station #D is moved to the transition state 30 after the predetermined time elapses (FIG. 14A). Since no reception request is received from the station #B after another predetermined time elapses, the forcing state 650 of the station #D is moved to the forcing disabled state 20 and the current parameter table is reset (FIG. 14B).

The station #D receives the parameter table having the forced mode flag 610 being set to "enabled" from the station #C and updates the current parameter table on the basis of the received parameter table. Specifically, the forced mode flag 610 is set to "enabled" and the forcing state 650 is moved to the forcing enabled state 10. The request source address 620 is set to the address of the station #A and the transmission source address 630 is set to the address of the station #C. The number of relay stations 640 is set to zero given by subtracting one from one at the reception (FIG. 14C).

As described above and according to the embodiments, each wireless communication device transmits the current parameter table of the own station to propagate the parameter table and updates the current parameter table, if necessary, on the basis of the received parameter table. The parameter table may be unicasted or broadcasted, as described above.

Figure 15:
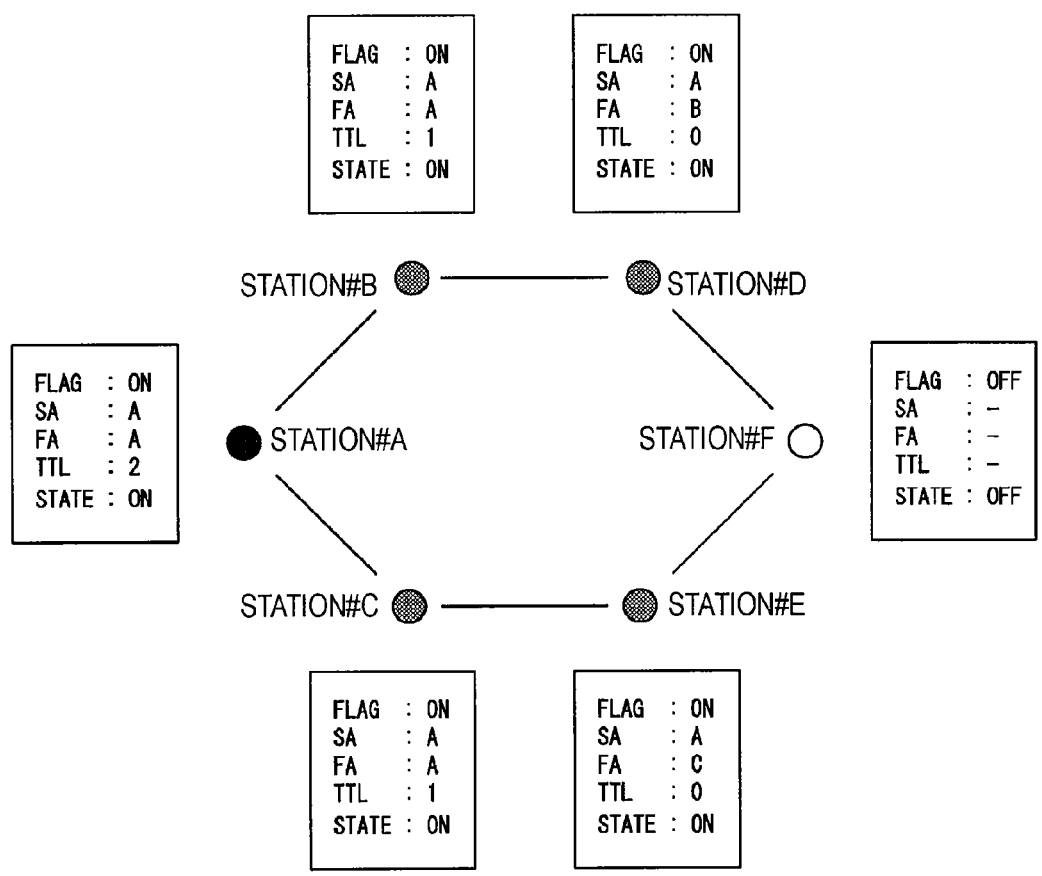
FIG. 15 shows an example of a manner in which the parameter table is propagated, according to an embodiment.

The propagation of the parameter table will now be described. FIG. 15 shows an example of a manner in which the parameter table is propagated, according to an embodiment of the present invention. In this example, the reception request having the number of relay stations 640 being set to two is submitted from the station #A.

The station #A broadcasts the parameter table to the stations #B and #C, which are neighbor stations, in the broadcast. In contrast, the station #A identifies the stations #B and #C on the basis of a neighborhood list (not shown) and individually transmits the parameter table to the stations #B and #C in the unicast. In the stations #B and #C, the new number of relay stations 640 is set to one given by subtracting one from the number of relay stations 640 in the received parameter table.

The stations #B and #C broadcast the parameter table to the stations #A and #D and to the stations #A and #E, which are neighbor stations, in the broadcast. In contrast, the stations #B and #C identify the stations #A and #D and the stations #A and #E on the basis of a neighborhood list (not shown) and individually transmits the parameter table to the stations #A and #D and to the stations #A and #E in the unicast. In the stations #D and #E, the new number of relay stations 640 is set to zero given by subtracting one from the number of relay stations 640 in the received parameter table. The station #A does not update the parameter table because the priorities of the parameter tables received from the stations #B and #C are lower than the priority of the current parameter table of the station #A.

The stations #D and #E broadcast the parameter table to the stations #B and #F and to the stations #C and #F, which are neighbor stations, in the broadcast. In contrast, the stations #D and #E do not transmit the parameter table any more in the unicast because the number of relay stations 640 is set to zero in the stations #D and #E.

The station #F does not update the current parameter table because the number of relay stations 640 is set to zero in the parameter tables broadcasted from the stations #D and #E. The station #F does not transmit the parameter table any more. The stations #B and #C do not update the current parameter tables because the priorities of the parameter tables broadcasted from the stations #D and #E are lower than the priorities of the current parameter tables of the stations #B and #C.

As described above, the parameter table may be unicasted or broadcasted.

An operation of the wireless communication device according to embodiments will be described with reference to the drawings.

Figure 16:
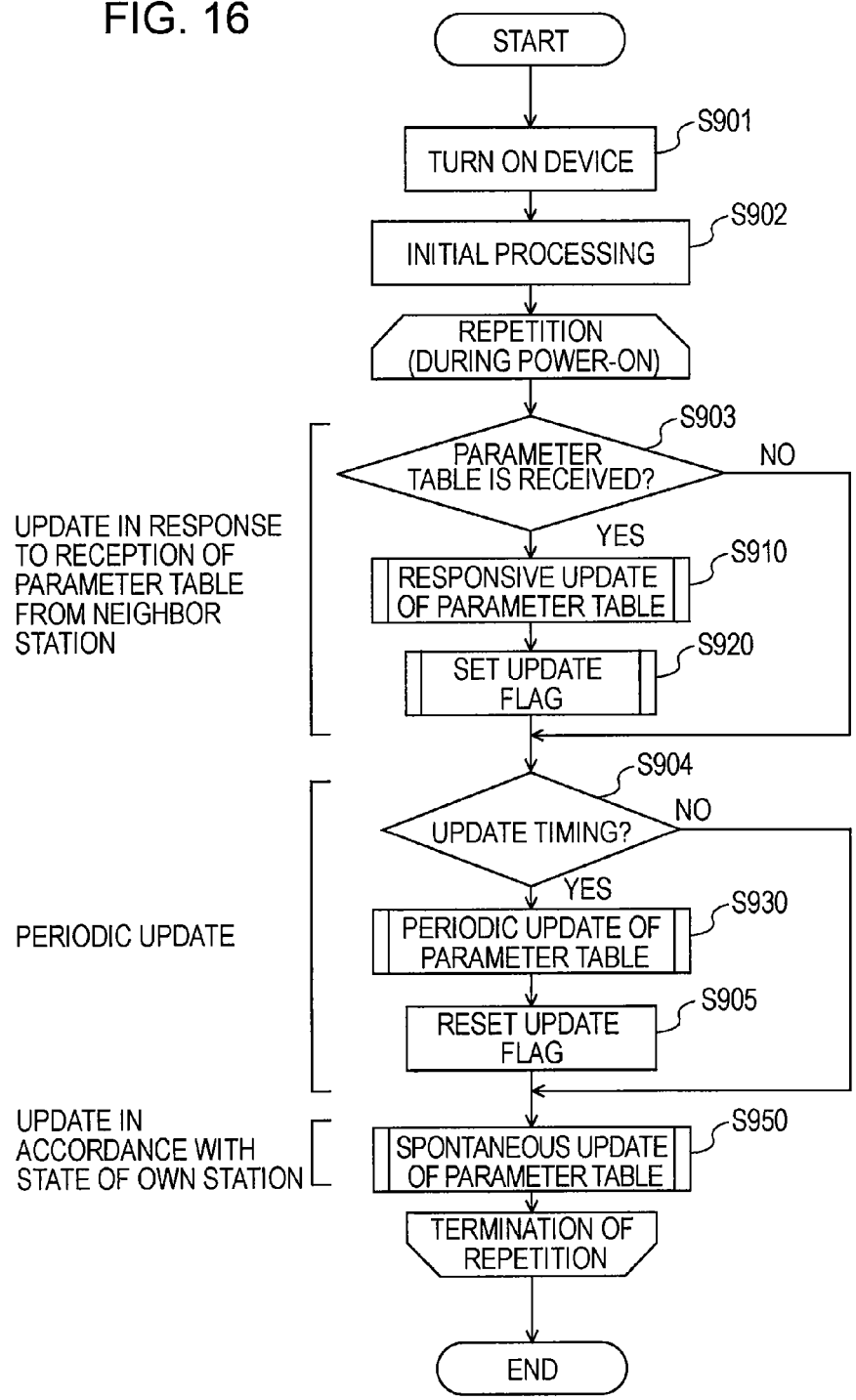
FIG. 16 is a flowchart showing an example of an operation of the wireless communication device according to an embodiment.

FIG. 16 is a flowchart showing an example of the operation of the wireless communication device according to an embodiment.

In Step S901, the wireless communication device is turned on. In Step S902, the wireless communication device performs initial processing for the current parameter table immediately after the wireless communication device is turned on. The initial processing is, for example, authentication between the wireless communication device and neighbor stations. In a common method of authenticating neighbor stations, the presence of the destination device is confirmed in advance in some way and, then, packets relating to the authentication are transmitted to and received from the neighbor stations. For example, after the transmission and reception of beacons is performed between wireless communication devices to recognize the presence of the destination device, the transmission and reception of the packets relating the authentication is started.

In order to rapidly enter into the authentication sequence after the presence of the destination device is recognized, both the source device and the destination device should enter into the normal mode. In other words, when the destination device is in the intermittent mode, the reception request should be submitted to the destination device in advance. In this case, for example, the forced mode flag 610 is set to "enabled, the request source address 620 and the transmission source address 630 are set to the address of the own station, the number of relay stations 640 is set to one, and the forcing state 650 is set to the forcing enabled state 10, as the initial values in the current parameter table, to submit the reception request. Then, after it is confirmed from the parameter table received from the neighbor stations that the destination device enters into the forced mode, in addition to the confirmation of the presence of the destination device to be authenticated, the authentication sequence is stared.

The update of the current parameter table according to an embodiment of the present invention is roughly divided into three processes: 1) an update process in response to reception of the parameter table from the neighbor stations, 2) a periodic update process, and 3) an update process according to the state of the own station. These update processes are repeated until the wireless communication device is turned off.

As the update process in response to reception of the parameter table from the neighbor stations, in Step S903, the wireless communication device determines whether the parameter table is received from another wireless communication device, which is a neighbor station. If the wireless communication device determines that the parameter table is received from another wireless communication device, then in Step S910, the wireless communication device performs an update process based on the received parameter table (referred to as a responsive update process). As a result, in Step S920, the wireless communication device sets an update flag indicating whether a predetermined update process is performed for the current parameter table. This update flag is used to detect a timeout, meaning that the current parameter table is not updated for a predetermined time.

Next, as the periodic update process, in Step S904, the wireless communication device determines whether it is time to perform the update. If the wireless communication device determines that it is time to perform the update, then in Step S930, the wireless communication device performs the periodic update process for the current parameter table. In Step S905, the wireless communication device resets the update flag.

Finally, as the update process according to the state of the own station, in Step S950, the wireless communication device performs a spontaneous update process for the current parameter table when the wireless communication device submits the reception request or when the wireless communication device cancels the reception request to terminate the forced mode.

The operation in FIG. 16 will be described in detail with reference to FIGS. 17 to 25. Referring to FIGS. 17 to 25, the current parameter table is denoted by "ptbl_now" and the received parameter table is denoted by "ptbl_new". In these parameter tables, the forced mode flag 610 is denoted by "flag", the request source address 620 is denoted by "sa", the transmission source address 630 is denoted by "fa", the number of relay stations 640 is denoted by "ttl", and the forcing state 650 is denoted by "state". For example, the forcing state 650 in the current parameter table is represented as "ptbl_now state" by combining the above notations. The priority of the current parameter table is denoted by "ptbl_now priority" and the priority of the received parameter table is denoted by "ptbl_new_priority".

Figure 17:
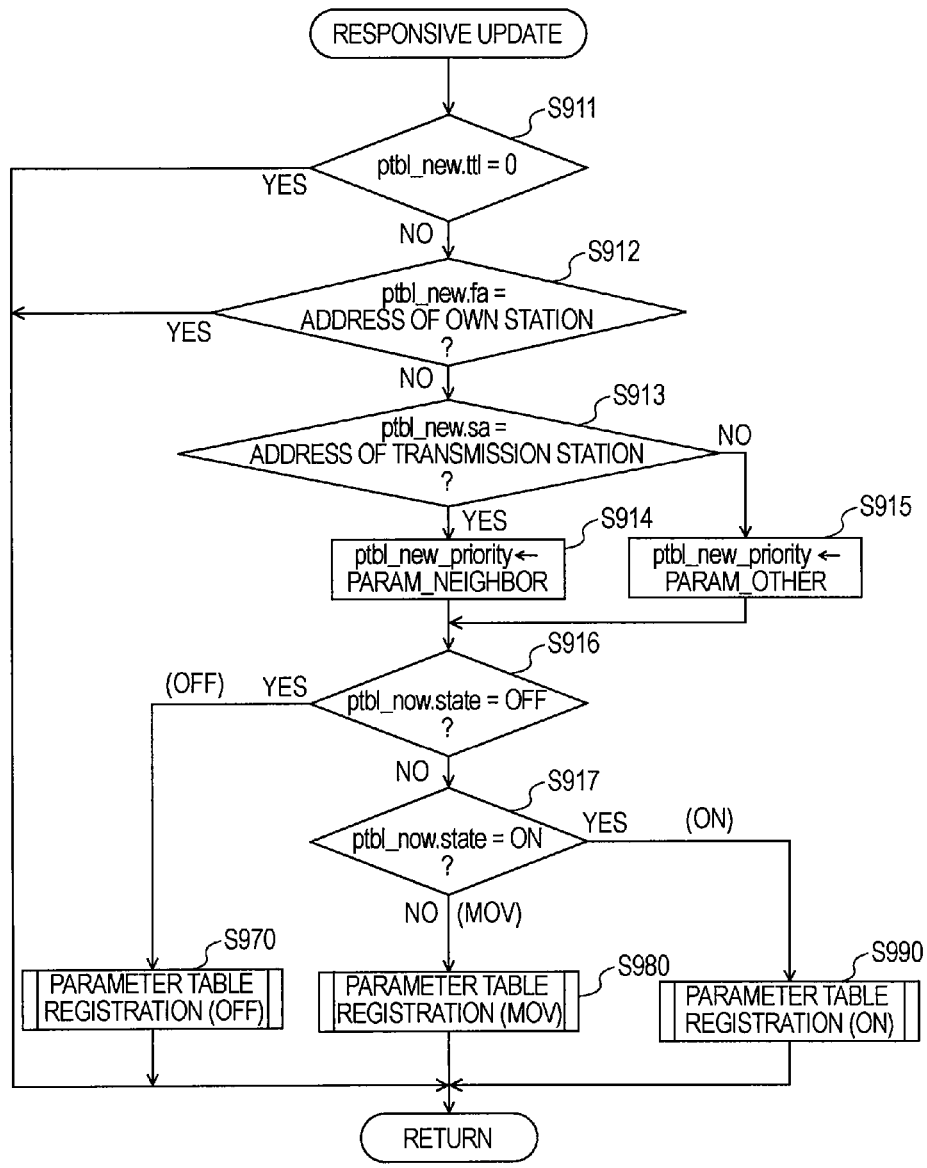
FIG. 17 is a flowchart showing an example of a responsive update process for the parameter table, according to an embodiment.

FIG. 17 is a flowchart showing an example of the responsive update process (Step S910) for the parameter table, according to an embodiment of the present invention.

As the assumption of the responsive update process, the process determines in Step S911 whether the number of relay stations 640 in the received parameter table is set to zero and determines in Step S912 whether the transmission source address 630 in the received parameter table is set to the address of the own station. If the process determines in Step S911 that the number of relay stations 640 in the received parameter table is set to zero and determines in Step S912 that the transmission source address 630 in the received parameter table is set to the address of the own station, the responsive update process is not performed.

If the process determines in Step S911 that the number of relay stations 640 in the received parameter table is not set to zero and determines in Step S912 that the transmission source address 630 in the received parameter table is not set to the address of the own station, then in Step S913, the process determines whether the request source address 620 in the received parameter table coincides with the address of the transmission station. If the process determines that the request source address 620 in the received parameter table coincides with the address of the transmission station, then in Step S914, the wireless communication device sets "PARAM_NEIGHBOR" indicating the "priority 2" as the priority of the received parameter table. If the process determines that the request source address 620 in the received parameter table does not coincide with the address of the transmission station, then in Step S915, the wireless communication device sets "PARAM_OTHER" indicating the "priority 3" as the priority of the received parameter table.

In Step S916, the process determines whether the forcing state 650 in the current parameter table is set to the forcing disabled state 20. If the process determines that the forcing state 650 in the current parameter table is set to the forcing disabled state 20, then in Step S970, the wireless communication device performs a process of registering the parameter table in the forcing disabled state 20 (OFF). If the process determines in Step S916 that the forcing state 650 in the current parameter table is not set to the forcing disabled state 20, then in Step S917, the process determines whether the forcing state 650 in the current parameter table is set to the forcing enabled state 10. If the process determines that the forcing state 650 in the current parameter table is set to the forcing enabled state 10, then in Step S990, the wireless communication device performs a process of registering the parameter table in the forcing enabled state 10 (ON). If the process determines in Step S917 that the forcing state 650 in the current parameter table is not set to the forcing enabled state 10, that is, that the forcing state 650 in the current parameter table is set to the transition state 30, then in Step S980, the wireless communication device performs a process of registering the parameter table in the transition state 30 (MOV).

Figure 18:
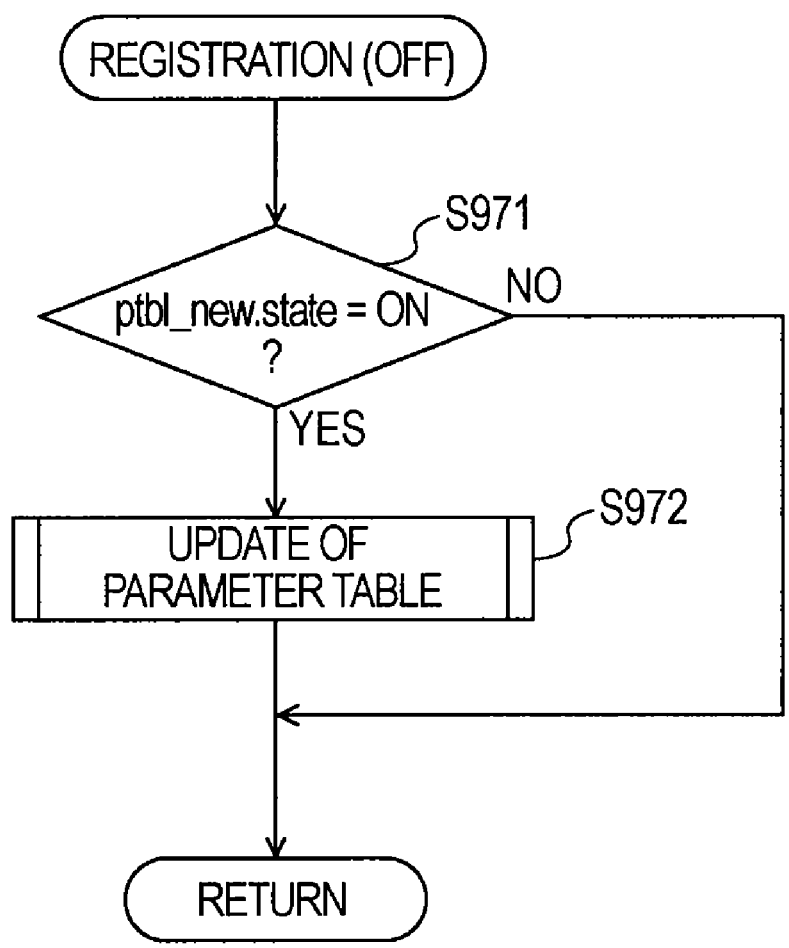
FIG. 18 is a flowchart showing an example of a process of registering the parameter table in a forcing disabled state, according to an embodiment.

FIG. 18 is a flowchart showing an example of the registration process (Step S970) of the parameter table in the forcing disabled state 20 (OFF), according to an embodiment. In step S971, the process determines whether the forcing state 650 in the received parameter table is set to the forcing enabled state 10 when the forcing state 650 in the current parameter table is set to the forcing disabled state 20. If the process determines that the forcing state 650 in the received parameter table is set to the forcing enabled state 10 when the forcing state 650 in the current parameter table is set to the forcing disabled state 20, then in Step S972, the wireless communication device performs a process of updating the parameter table.

Figure 19:
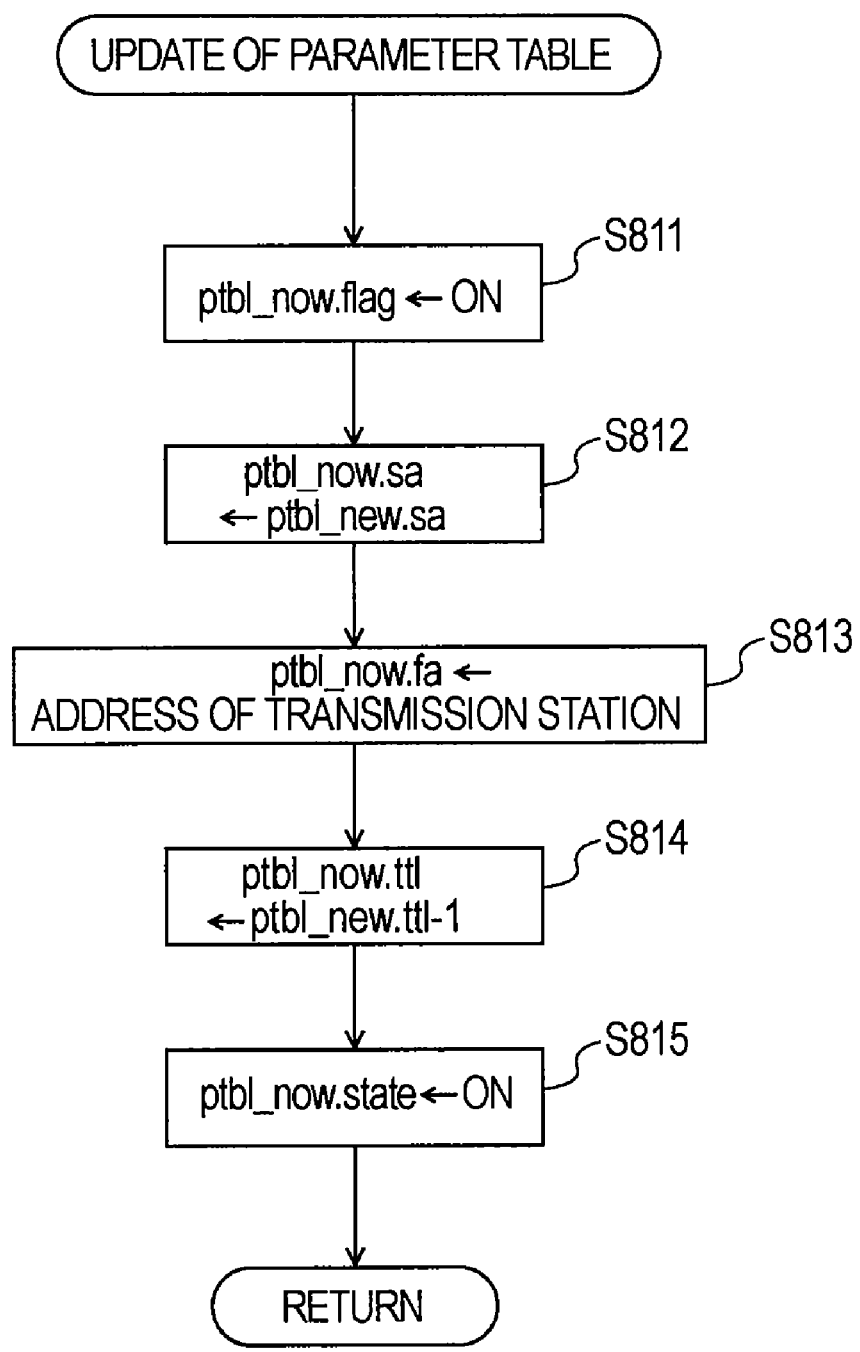
FIG. 19 is a flowchart showing an example of a process of updating the parameter table, according to an embodiment.

FIG. 19 is a flowchart showing an example of the process (Step S972) of updating the parameter table, according to an embodiment of the present invention. In this example, the current parameter table is updated on the basis of the received parameter table.

In Step S811, the process sets the forced mode flag 610 in the current parameter table to "enabled." In Step S812, the process sets the request source address 620 in the current parameter table to the request source address 620 in the received parameter table. In Step S813, the process sets the transmission source address 630 in the current parameter table to the address of the transmission station in the received parameter table.

In Step S814, the process sets the number of relay stations 640 in the current parameter table to a value given by subtracting one from the number of relay stations 640 in the received parameter table. In Step S815, the process sets the forcing state 650 in the current parameter table to the forcing enabled state 10.

Figure 20:
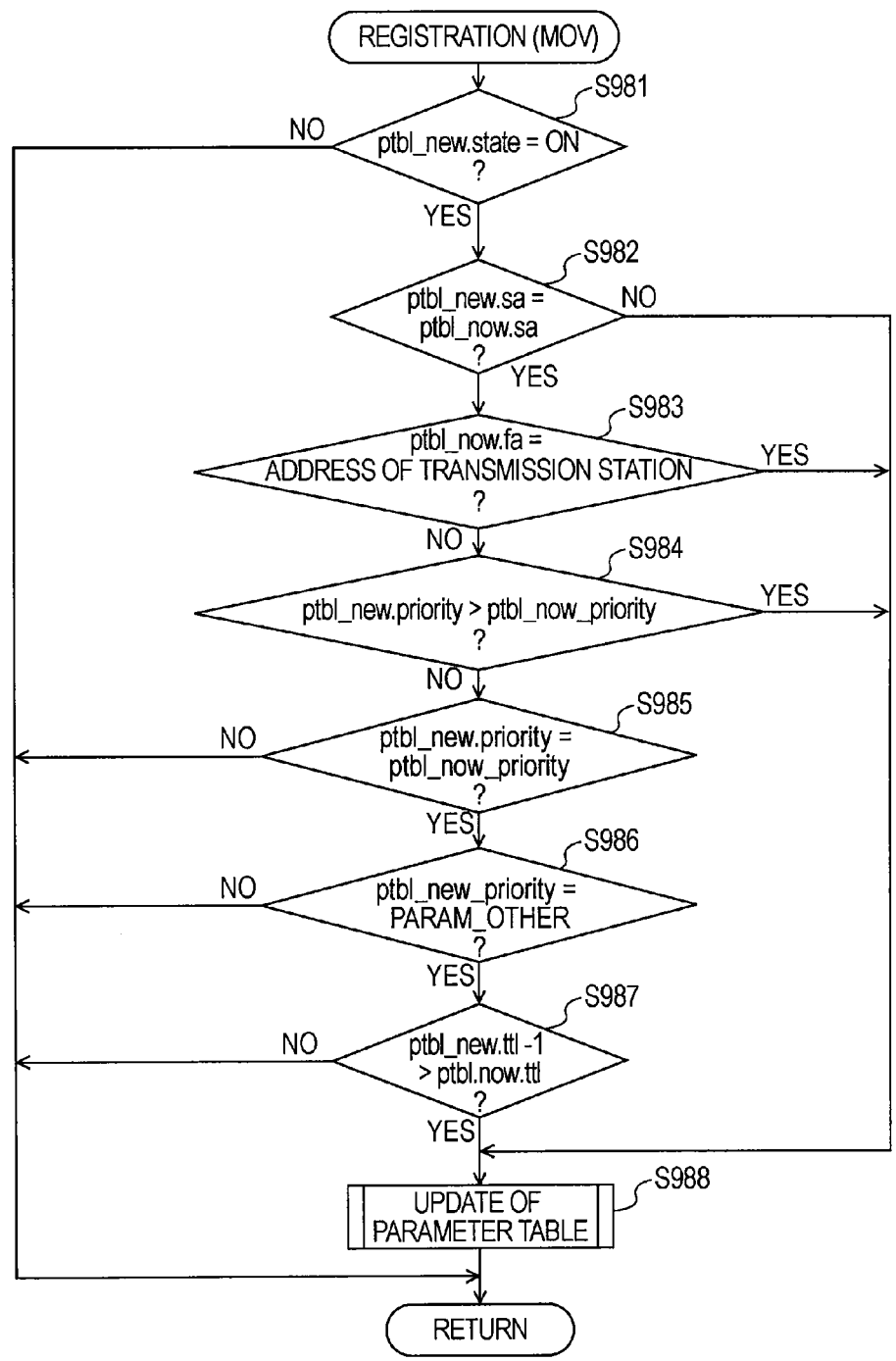
FIG. 20 is a flowchart showing an example of a process of registering the parameter table in a transition state, according to an embodiment.

FIG. 20 is a flowchart showing an example of the process (Step S980) of registering the parameter table in the transition state 30 (MOV), according to an embodiment. In Step S981, the process determines whether the forcing state 650 in the received parameter table is set to the forcing enabled state 10 (ON). Since this registration process is limited to the case where the forcing state 650 in the received parameter table is set to the forcing enabled state 10, the registration process is not performed otherwise.

In Step S982, the process determines whether the request source address 620 in the current parameter table coincides with the request source address 620 in the received parameter table. If the process determines that the request source address 620 in the current parameter table does not coincide with the request source address 620 in the received parameter table, the process assumes that a new reception request is submitted and, then in Step S988, the process performs the process of updating the parameter table. The process of updating the parameter table in Step S988 is the same as the one described above with reference to FIG. 19.

If the process determines in Step S982 that the request source address 620 in the current parameter table coincides with the request source address 620 in the received parameter table, then in Step S983, the process determines whether the transmission source address 630 in the current parameter table coincides with the address of the transmission station in the received parameter table. If the process determines that the transmission source address 630 in the current parameter table coincides with the address of the transmission station in the received parameter table, then in Step S988, the process performs the process of updating the parameter table because the process assumes that the submission of the reception request is probably continued.

Otherwise, the process determines whether the process of updating the parameter table is performed on the basis of the priority of the parameter table. Specifically, in Step S984, the process determines whether the priority of the received parameter table is higher than the priority of the current parameter table. If the process determines that the priority of the received parameter table is higher than the priority of the current parameter table, then in Step S988, the process performs the process of updating the parameter table. If the process determines that the priority of the received parameter table is not higher than the priority of the current parameter table, then in Step S985, the process determines whether the priority of the received parameter table is equal to the priority of the current parameter table. If the process determines that the priority of the received parameter table is equal to the priority of the current parameter table, then in Step S986, the process determines whether the priority of the received parameter table is set to the "priority 3" (PARAM_OTHER). If the process determines that the priority of the received parameter table is set to the "priority 3" (PARAM_OTHER), then in Step S987, the process determines whether a value given by subtracting one from the number of relay stations 640 in the received parameter table is larger than the number of relay stations 640 in the current parameter table. If the process determines that the value given by subtracting one from the number of relay stations 640 in the received parameter table is larger than the number of relay stations 640 in the current parameter table, then in Step S988, the process performs the process of updating the parameter table.

Figure 21:
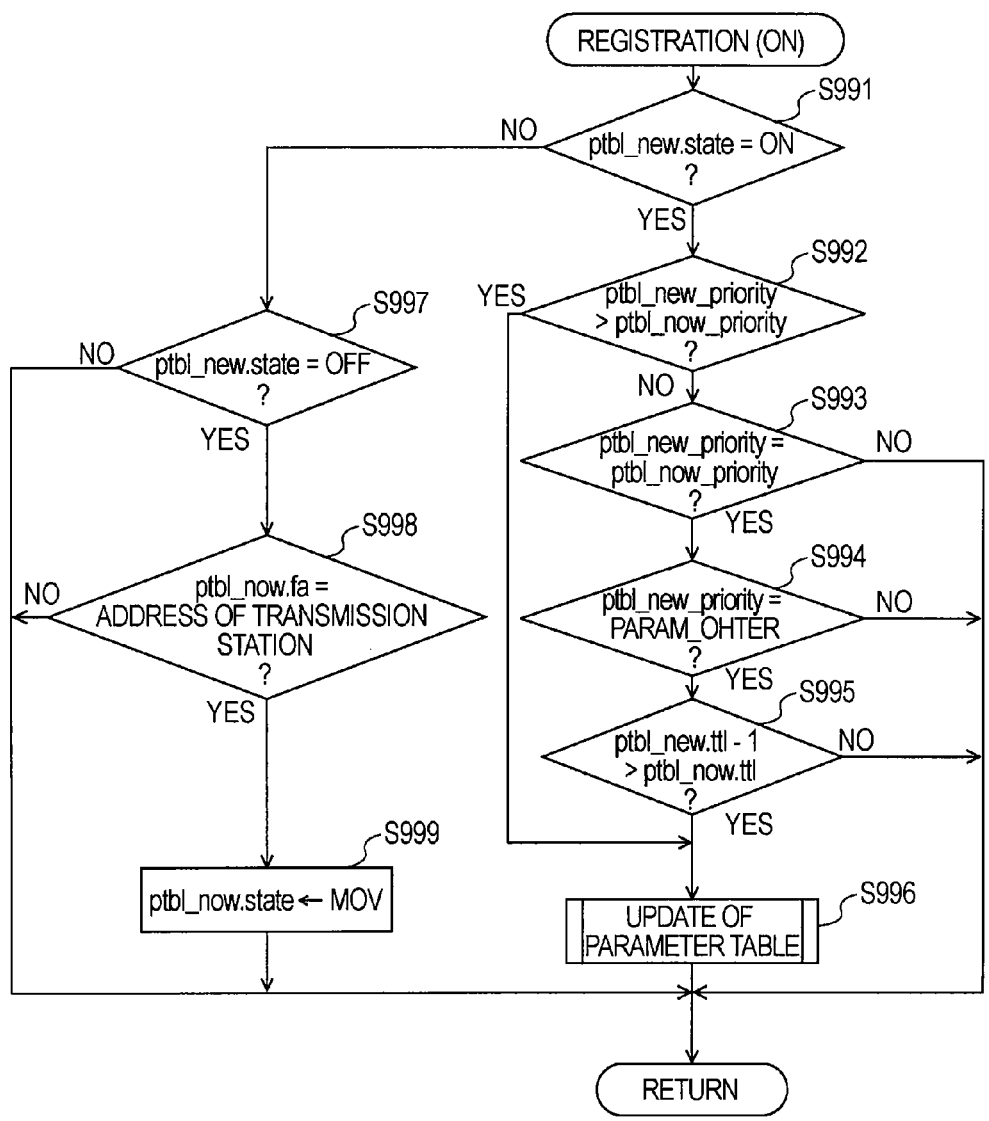
FIG. 21 is a flowchart showing an example of a process of registering the parameter table in a forcing enabled state, according to an embodiment.

FIG. 21 is a flowchart showing an example of the process (Step S990) of registering the parameter table in the forcing enabled state 10 (ON), according to an embodiment of the present invention. In Step S991, the process determines whether the forcing state 650 in the received parameter table is set to the forcing enabled state 10 (ON). Since this registration process is limited to the case where the forcing state 650 in the received parameter table is set to the forcing enabled state 10, the registration process is not performed otherwise. If the process determines that the forcing state 650 in the received parameter table is not set to the forcing enabled state 10 (ON), then in Step S997, the process determines whether the forcing state 650 in the received parameter table is set to the forcing disabled state 20. If the process determines that the forcing state 650 in the received parameter table is set to the forcing disabled state 20, then in Step S998, the process determines whether the transmission source address 630 in the current parameter table coincides with the address of the transmission station in the received parameter table. If the process determines that the transmission source address 630 in the current parameter table coincides with the address of the transmission station in the received parameter table, the process assumes that cancel of the forced mode is instructed and, then in Step S999, the process changes the forcing state 650 in the current parameter table to the transition state 30.

If the process determines in Step S991 that the forcing state 650 in the received parameter table is set to the forcing enabled state 10 (ON), the process determines whether the process of updating the parameter table is performed on the basis of the priority of the parameter table. Specifically, in Step S992, the process determines whether the priority of the received parameter table is higher than the priority of the current parameter table. If the process determines that the priority of the received parameter table is higher than the priority of the current parameter table, then in Step S996, the process performs the process of updating the parameter table. If the process determines in Step S992 that the priority of the received parameter table is not higher than the priority of the current parameter table, then in Step S993, the process determines whether the priority of the received parameter table is equal to the priority of the current parameter table. If the process determines that the priority of the received parameter table is equal to the priority of the current parameter table, then in Step S994, the process determines whether the priority of the received parameter table is set to the "priority 3" (PARAM_OTHER). If the process determines that the priority of the received parameter table is set to the "priority 3" (PARAM_OTHER), then in Step S995, the process determines whether a value given by subtracting one from the number of relay stations 640 in the received parameter table is larger than the number of relay stations 640 in the current parameter table. If the process determines that the value given by subtracting one from the number of relay stations 640 in the received parameter table is larger than the number of relay stations 640 in the current parameter table, then in Step S996, the process performs the process of updating the parameter table. The process (Step S996) of updating the parameter table is the same as the one described above with reference to FIG. 19.

Figure 22:
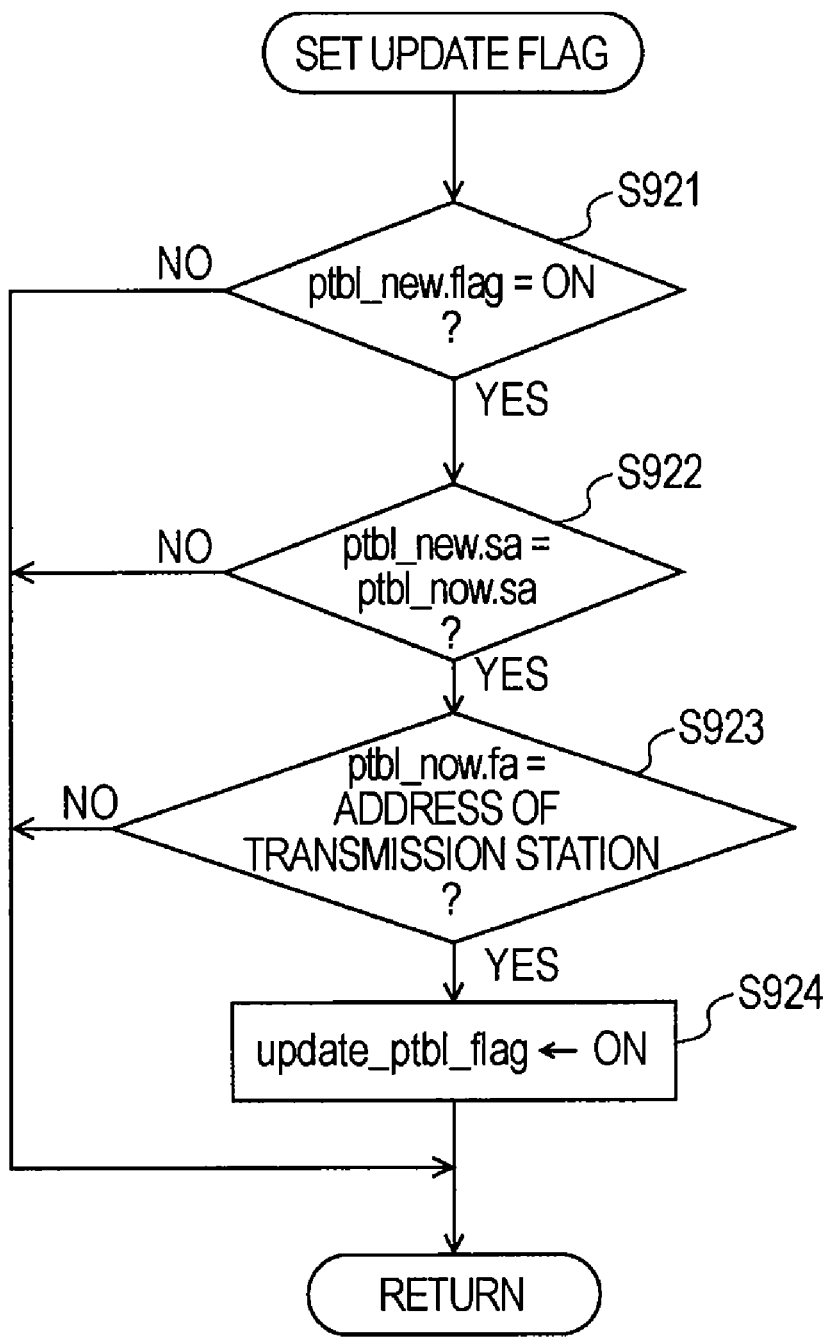
FIG. 22 is a flowchart showing an example of a process of setting an update flag, according to an embodiment.

FIG. 22 is a flowchart showing an example of the process (Step S920) of setting the update flag, according to an embodiment. In this example, in Step S921, the process determines whether the forced mode flag 610 in the received parameter table is set to "enabled." If the process determines that the forced mode flag 610 in the received parameter table is set to "enabled," then in Step S922, the process determines whether the request source address 620 in the received parameter table coincides with the request source address 620 in the current parameter table. If the process determines that the request source address 620 in the received parameter table coincides with the request source address 620 in the current parameter table, then in Step S923, the process determines whether the transmission source address 630 in the current parameter table coincides with the address of the transmission station in the received parameter table. If the process determines that the transmission source address 630 in the current parameter table coincides with the address of the transmission station in the received parameter table, then in Step S924, the process sets the update flag to "ON." The update flag is denoted by "update_ptbl_flag" in FIG. 22.

Figure 23:
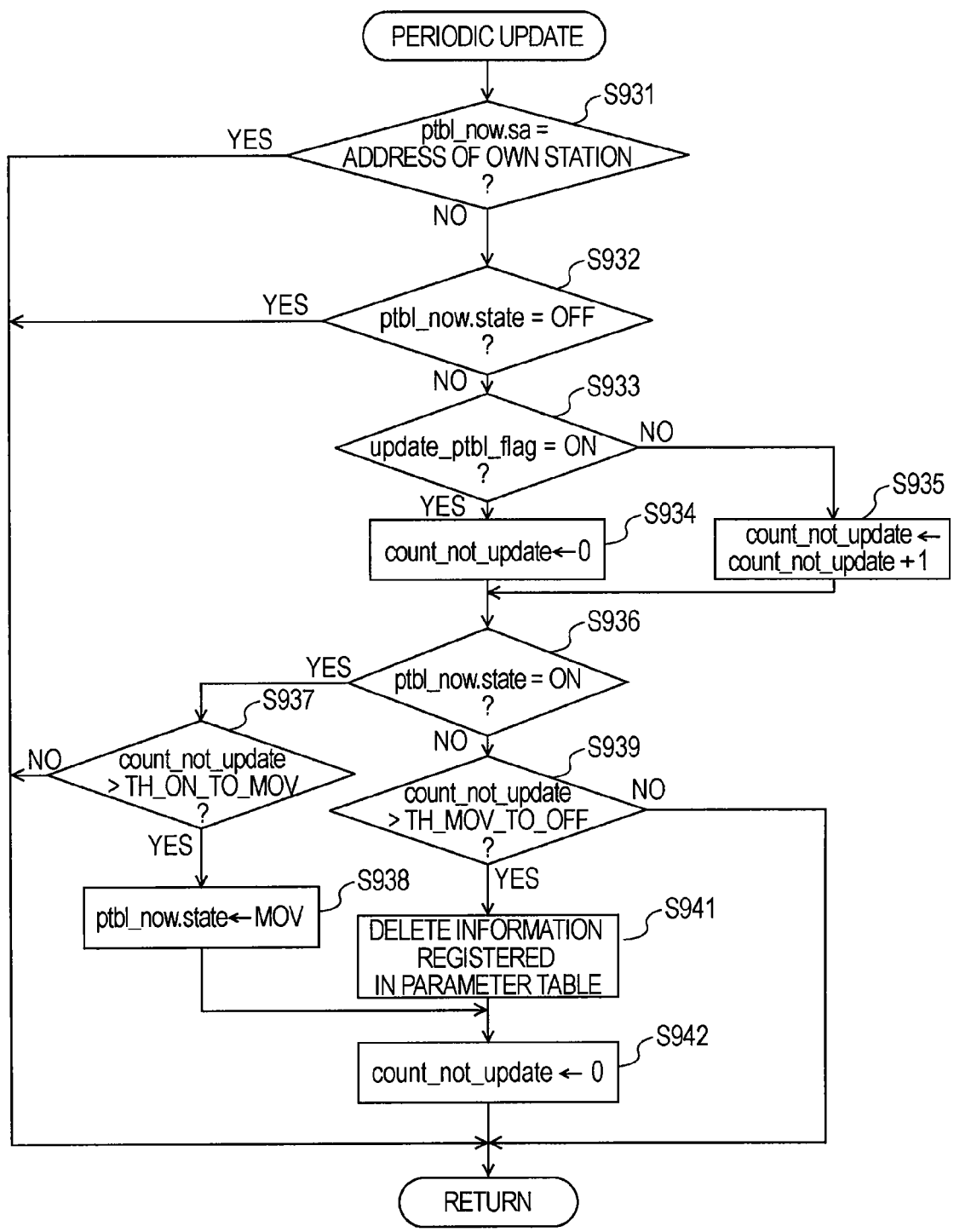
FIG. 23 is a flowchart showing an example of a periodic update process for the current parameter table, according to an embodiment.

FIG. 23 is a flowchart showing an example of the periodic update process (Step S930) for the parameter table, according to an embodiment of the present invention.

As the assumption of the periodic update process, the process determines in Step S931 whether the request source address 620 in the current parameter table is set to the address of the own station and determines in Step S932 whether the forcing state 650 in the current parameter table is set to the forcing disabled state 20. If the process determines in Step S931 that the request source address 620 in the current parameter table is set to the address of the own station and determines in Step S932 that the forcing state 650 in the current parameter table is set to the forcing disabled state 20, the periodic update process is not performed. If the request source address 620 in the current parameter table is set to the address of the own station, the spontaneous update process for the parameter table, described below with reference to FIG. 24, is performed.

In order to detect whether the current parameter table is not updated for a predetermined time, a non-update counter is set on the basis of the state of the update flag. Specifically, in Step S933, the process determines whether the update flag is set to "ON." If the process determines that the update flag is set to "ON," then in Step S934, the process resets the non-update counter to zero. If the process determines that the update flag is set to "OFF," then in Step S935, the process increments the non-update counter by one. The non-update counter is denoted by "count_not_update" in FIG. 23.

In Step S936, the process determines whether the forcing state 650 in the current parameter table is set to the forcing enabled state 10. If the process determines that the forcing state 650 in the current parameter table is set to the forcing enabled state 10, then in Step S937, the process determines whether the value of the non-update counter is higher than a predetermined threshold (TH_ON_TO_MOV). If the process determines that the value of the non-update counter is higher than the predetermined threshold (TH_ON_TO_MOV), then in Step S938, the process determines that a timeout of the forcing enabled state 10 occurs and changes the forcing state 650 in the current parameter table to the transition state 30. If the process determines in Step S936 that the forcing state 650 in the current parameter table is not set to the forcing enabled state 10, then in Step S939, the process determines whether the value of the non-update counter is larger than a predetermined threshold (TH_MOV_TO_OFF). If the process determines that the value of the non-update counter is larger than the predetermined threshold (TH_MOV_TO_OFF), then in Step S941, the process determines that a timeout of the transition state 30 occurs to reset the content of the current parameter table and changes the forcing state 650 in the current parameter table to the forcing disabled state 20. In Step S942, the process resets the non-update counter to zero.

Figure 24:
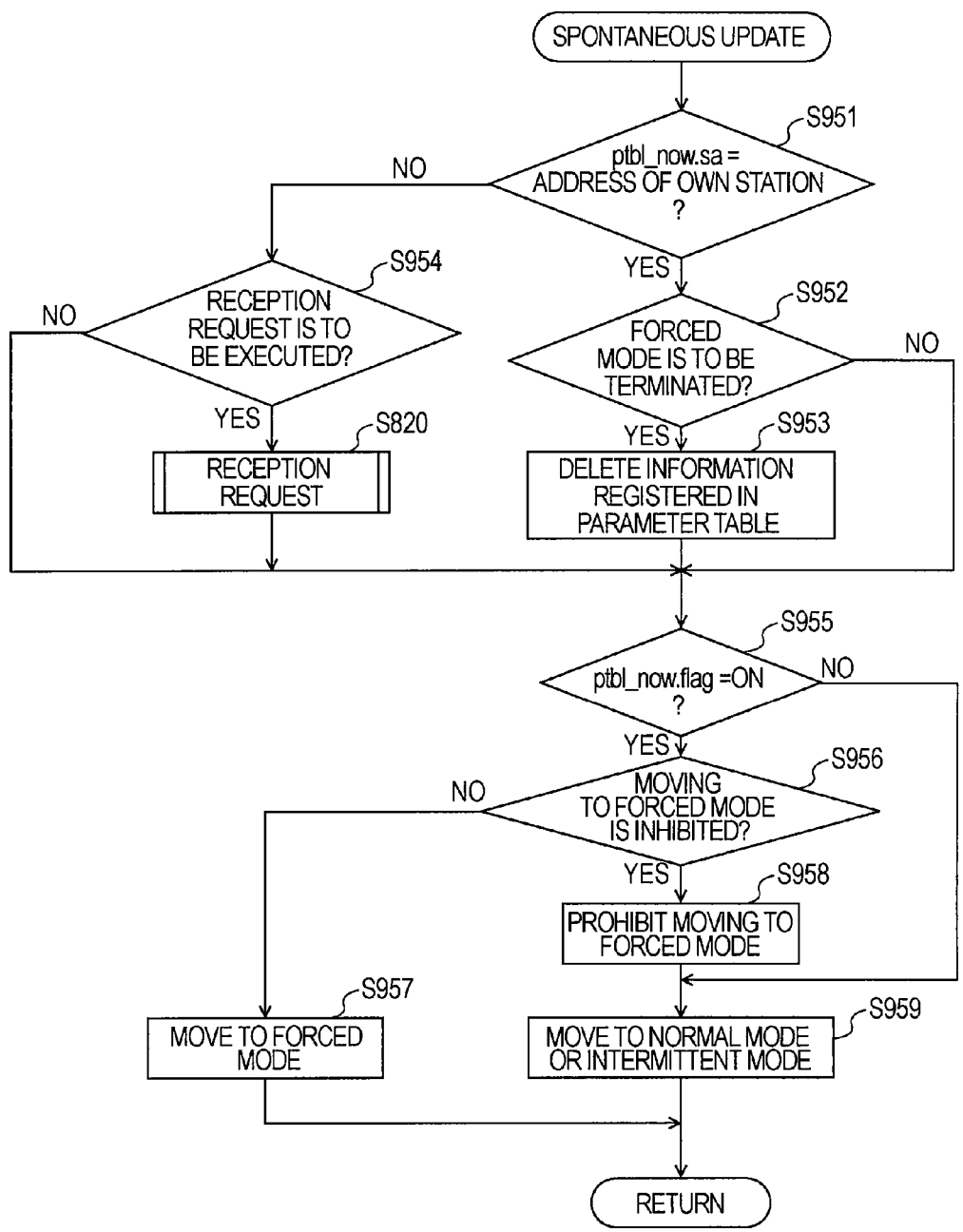
FIG. 24 is a flowchart showing an example of a spontaneous update process for the parameter table, according to an embodiment.

FIG. 24 is a flowchart showing an example of the spontaneous update process (S950) for the parameter table, according to an embodiment.

In Step S951, the process determines whether the request source address 620 in the current parameter table is set to the address of the own station. If the process determines that the request source address 620 in the current parameter table is set to the address of the own station, then in Step S952, the process determines whether the reception request from the own station is canceled to terminate the forced mode. If the process determines that the reception request from the own station is canceled to terminate the forced mode, then in Step S953, the process resets the content of the current parameter table. As a result, the forcing state 650 in the current parameter table is moved to the forcing disabled state 20.

If the process determines in Step S951 that the request source address 620 in the current parameter table is not set to the address of the own station, then in Step S954, the process determines whether the reception request is submitted from the own station. If the program determines that the reception request is submitted from the own station, then in Step S820, the process sets values in the items in the current parameter table (a reception request process).

In Step S955, the process determines whether the forced mode flag 610 in the current parameter table is set to "enabled." If the process determines that the forced mode flag 610 in the current parameter table is set to "disabled," then in Step S959, the process cancels the forced mode. Specifically, the forced mode is moved to the normal mode or to the intermittent mode under the control of the power mode controller 160 in Step S959.

If the process determines in Step S955 that the forced mode flag 610 in the current parameter table is set to "enabled," the power mode is generally moved to the forced mode in Step S957. However, if the process determines in Step S956 that the moving to the forced mode is prohibited for any reason, for example, if the own station is driven by a battery and it is difficult to perform the constant transmission and reception operation for a long time, then in Step S958, the process performs a process of prohibiting the moving to the forced mode. In Step S959, the forced mode is moved to the normal mode or the intermittent mode under the control of the power mode controller 160.

In the prohibition of the moving to the forced mode, a user may manually set a flag for prohibiting the moving to the forced mode or the wireless communication device may automatically set the flag. The process (Step S958) of prohibiting the moving to the forced mode is exemplified by setting the number of relay stations 640 in the current parameter table to zero to stop the submission of the reception request to the neighbor stations through the own station serving as a relay station.

Figure 25:
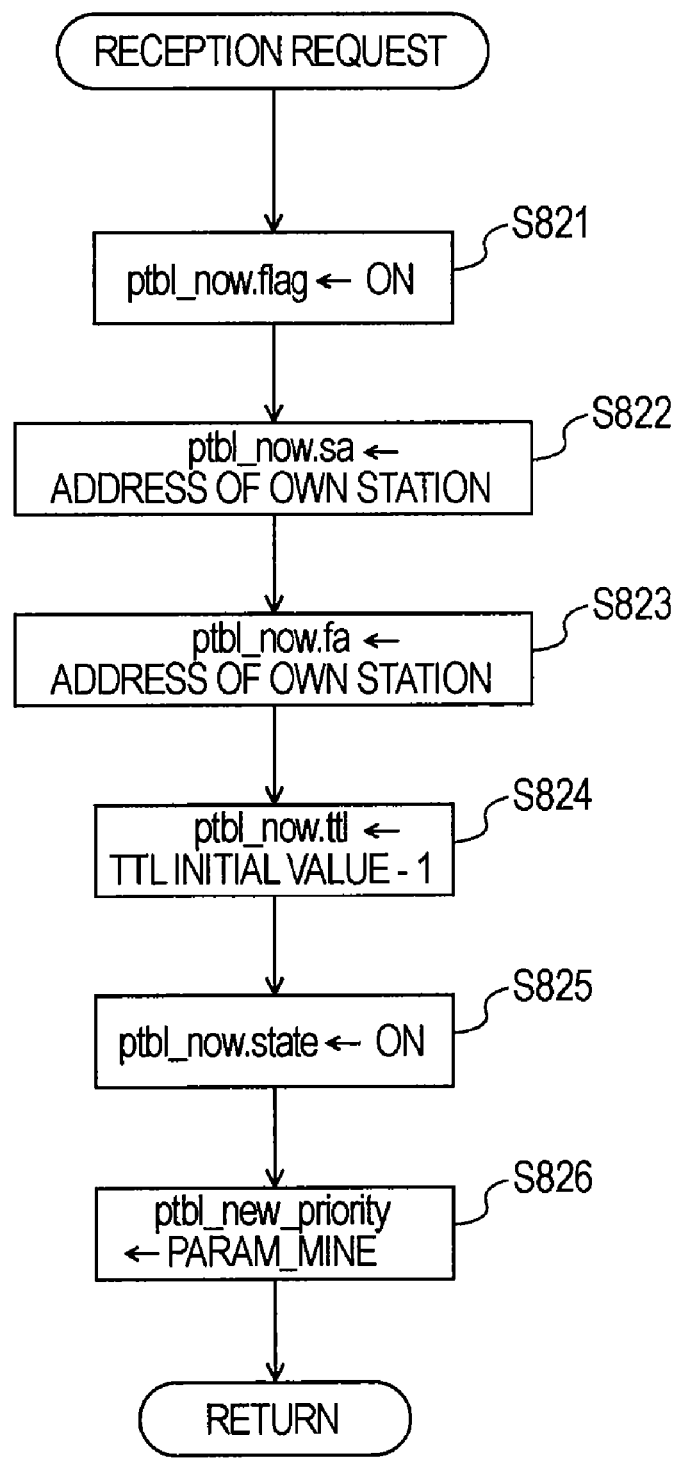
FIG. 25 is a flowchart showing an example of a reception request process, according to an embodiment.

FIG. 25 is a flowchart showing an example of the reception request process (Step S820), according to an embodiment. In this example, a new current parameter table is set for the reception request.

In Step S821, the process sets the forced mode flag 610 in the current parameter table to "enabled." In Step S822, the process sets the request source address 620 in the current parameter table to the address of the own station. In Step S823, the process sets the transmission source address 630 in the current parameter table to the address of the own station.

In Step S824, the process sets the number of relay stations 640 in the current parameter table to a value given by subtracting one from the initial value. In Step S825, the process sets the forcing state 650 in the current parameter table to the forcing enabled state 10. In Step S826, the process sets the priority of the current parameter table to "PARAM_MINE" indicating the "priority 1," which is the highest priority.

The reception request is executed, for example, at a timing when a routing protocol sequence requiring transmission of broadcast packets, typified by an ad hoc on-demand distance vector (AODV), is executed in an ad hoc network. Although the flooding technology using the broadcast packets called the RREQ packets is employed in the routing, the number of devices that cannot receive the broadcast packets is increased if any device in the intermittent mode exists in the network in which the routing is performed. As a result, a route different form the one assumed by the routing protocol is formed and it possibly takes a longer time to follow the route. In this case, submitting the reception request to the devices in the network in which the routing is performed to temporarily move all the devices in the network to the state in which the transmission and reception is enabled allows the broadcast packets to be forcedly received.

As described above, according to the embodiments of the present invention, it is possible to forcedly move the neighbor stations to the state in which the transmission and reception is constantly enabled in the autonomous decentralized wireless network. In other words, it is possible to produce the state in which the transmission and reception is constantly enabled or the intermittent operation state in an arbitrary time segment in the network by the autonomous decentralized process. Accordingly, the flooding technology can be easily applied to the devices in the intermittent operation state. For example, it is possible to improve a delay in formation of the route in an autonomous-decentralized mesh ad hoc network.

In transmission and reception of control information, it is possible to use broadcast packets (for example, beacons) for indicating information used in a wireless communication network in a related art, in addition to control packets and etc. that are unicasted between the devices. Hence, it is possible to forcedly move the neighbor stations to the state in which the transmission and reception is constantly enabled without increasing overhead, compared with a method using a dedicated control packet or the like. In addition, since an existing packet can be used, the compatibility with wireless communication systems in related arts can be maintained to some extent.

Since it is sufficient to realize the communication between devices directly connected to each other in the embodiments of the present invention, the neighbor stations can be forcedly moved to the state in which the transmission and reception is constantly enabled by a relatively simple method, thus suppressing an increase in excess overhead.

In particular, it is possible to forcedly move not only the adjacent stations but also neighbor stations apart from the own station by several hops to the state in which the transmission and reception is constantly enabled by the autonomous decentralized process in each device in the embodiments of the present invention. Furthermore, the network having the adjacent stations and the neighbor stations forcedly moved to the state in which the transmission and reception is constantly enabled can be limited with respect to the number of hops. Accordingly, unnecessary power consumption can be suppressed in the entire network without unnecessarily moving the neighbor stations to the state in which the transmission and reception is constantly enabled.

According to the embodiments, the parameter table is managed in each device and the content of the management is indicated to the neighbor stations. The use of the parameter table allows the autonomous decentralized management of the transmission and reception operation while the consistency with the neighbor stations is kept. Since it is sufficient for each device to hold one parameter table, instead of the parameter tables of a number corresponding to the number of connected links with respect to the device, there is no problem of depletion of the memory resource etc. due to an increase in the number of the neighbor stations. In addition, since the content of only one parameter table is indicated to the neighbor stations, it is possible to suppress an increase in the number of unnecessary indication processes.

While the present application has been described with reference to exemplary embodiments, it is to be understood that the invention is not limited to the disclosed exemplary embodiments and there is certain correspondence between the features of the claims and the exemplary embodiments of the present invention, as discussed below. The scope of the following claims is to be accorded the broadest interpretation so as to encompass all modifications, equivalent structures and functions.

According to an embodiment, for example, the power mode control means corresponds to the power mode controller 160, the forcing information holding means corresponds to the current parameter table holder 110, the forcing information transmitting means corresponds to the transmitter 120, and the forcing-information update controlling means corresponds to the parameter table update controller 150.

According to another embodiment, for example, the power mode control means corresponds to the power mode controller 160, the forcing information holding means corresponds to the current parameter table holder 110, the forcing information transmitting means corresponds to the transmitter 120, the forcing information receiving means corresponds to the receiver 130, and the forcing-information update controlling means corresponds to the parameter table update controller 150.

According to an aspect of the embodiment, the reception updating means corresponds to, for example, the reception updater 151.

As the states of the forcing information according to another aspect of the embodiment of the present invention, the first state corresponds to the forcing enabled state 10, the second state corresponds to the forcing disabled state 20, and the third state corresponds to the transition state 30.

According to another aspect of the embodiment, the periodic update means corresponds to, for example, the periodic updater 152.

According to other embodiments, for example, the step of receiving the forcing information in another wireless communication device within the communication range of the own device from the other wireless communication device corresponds to Step S903; the step of updating the forcing information held in the forcing information holding means on the basis of a result of comparison between the forcing information held in the forcing information holding means and the forcing information in the other wireless communication device corresponds to Step S910; and the step of transmitting the updated forcing information to the other wireless communication device corresponds to the process performed by the transmitter 120.

The steps described in the embodiments may be interpreted as methods each having the series of steps. Alternatively, the steps may be interpreted as a program causing a computer to execute the series of steps or as a recording medium in which the programs are stored.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A wireless communication device communicating with a destination device outside a communication range of the own device through at least one relay station, the wireless communication device comprising:

power mode controlling means for performing saving control of power supplied to the own device;

forcing information holding means for holding forcing information including a forced mode flag indicating whether a forced operation instruction concerning the power saving control is enabled or disabled, and the forcing information including information corresponding to a limited number of the relay stations through which the forcing information is to be transmitted;

forcing information transmitting means for transmitting the forcing information to another wireless communication device within the communication range of the own device; and forcing-information update controlling means for updating the forcing information.

2. The wireless communication device according to claim 1, wherein the power mode control means performs forced switching to a power mode in which reception is enabled if the forced operation instruction indicated by the forced mode flag is enabled.

3. The wireless communication device according to claim 2, wherein the power mode control means does not switch to the power mode in which reception is enabled even with the forced operation instruction indicated by the forced mode flag being enabled, if the switching to the power mode in which reception is enabled is prohibited.

4. The wireless communication device according to claim 1, wherein the forcing information transmitting means transmits the forcing information that is included in a beacon signal periodically broadcasted.

5. A wireless communication device communicating with a destination device outside a communication range of the own device through at least one relay station, the wireless communication device comprising:

power mode controlling means for performing saving control of power supplied to the own device;

forcing information holding means for holding forcing information including a forced mode flag indicating whether a forced operation instruction concerning the power saving control is enabled or disabled, and the forcing information including information corresponding to a limited number of the relay stations through which the forcing information is to be transmitted;

forcing information transmitting means for transmitting the forcing information to another wireless communication device within the communication range of the own device;

forcing information receiving means for receiving forcing information held in the other wireless communication device from the other wireless communication device; and forcing-information update controlling means for updating the forcing information held in the forcing information holding means on the basis of a result of comparison between the forcing information held in the forcing information holding means and the forcing information received from the other wireless communication device.

6. The wireless communication device according to claim 5, wherein the forcing-information update controlling means includes reception updating means for updating the forcing information held in the forcing information holding means on the basis of the forcing information held in the other wireless communication device if a predetermined condition is satisfied.

7. The wireless communication device according to claim 6,
wherein the forcing information held in the forcing information holding means further includes, as the state of the forcing information, any of a first state in which the enablement of the forced operation instruction is indicated by the forced mode flag, a second state in which the disablement of the forced operation instruction is indicated by the forced mode flag, and a third state in transition from the first state to the second state, and
wherein the reception updating means updates the forcing information held in the forcing information holding means on the basis of the forcing information in the other wireless communication device under a predetermined condition, if the forcing information held in the other wireless communication device is in the first state.

8. The wireless communication device according to claim 7,
wherein the reception updating means changes the state of the forcing information held in the forcing information holding means to the third state under a predetermined condition if the forcing information held in the forcing information holding means is in the first state and the forcing information held in the other wireless communication device is in the second state.

9. The wireless communication device according to claim 6,
wherein the forcing-information update controlling means further includes periodic update means for updating the forcing information held in the forcing information holding means under a predetermined condition, if the forcing information held in the forcing information holding means is not updated by the reception updating means for a predetermined time.

10. The wireless communication device according to claim 9,
wherein the forcing information held in the forcing information holding means further includes, as the state of the forcing information, any of a first state in which the enablement of the forced operation instruction is indicated by the forced mode flag, a second state in which the disablement of the forced operation instruction is indicated by the forced mode flag, and a third state in transition from the first state to the second state, and
wherein the periodic update means changes the state of the forcing information held in the forcing information holding means to the third state if the forcing information held in the forcing information holding means is in the first state and the state of the forcing information is not updated for a predetermined time, and changes the state of the forcing information held in the forcing information holding means to the second state if the forcing information held in the forcing information holding means is in the third state and the state of the forcing information is not updated for the predetermined time.

11. The wireless communication device according to claim 5,
wherein the forcing information held in the forcing information holding means and the forcing information received from the other wireless communication device each include information corresponding to a priority of the forcing information.

12. The wireless communication device according to claim 11,
wherein the comparison between the forcing information held in the forcing information holding means and the forcing information received from the other wireless communication device is based on the priority of each forcing information.

13. The wireless communication device according to claim 11, wherein the priority of the forcing information is based on the number of the relay stations through which the forcing information is to be transmitted.

14. A control method for a wireless communication device communicating with a destination device outside a communication range of the own device through at least one relay station, the wireless communication device including power mode controlling means for performing saving control of power supplied to the own device and forcing information holding means for holding forcing information including a forced mode flag indicating whether a forced operation instruction concerning the power saving control is enabled or disabled, and the forcing information including information corresponding to a limited number of the relay stations through which the forcing information is to be transmitted, the method comprising the steps of:

receiving forcing information held in another wireless communication device within the communication range of the own device from the other wireless communication device;

updating the forcing information held in the forcing information holding means on the basis of a result of comparison between the forcing information held in the forcing information holding means and the forcing information received from the other wireless communication device; and transmitting the updated forcing information to the other wireless communication device.

15. The control method for a wireless communication device according to claim 14,
wherein the forcing information held in the forcing information holding means and the forcing information received from the other wireless communication device each include information corresponding to a priority of the forcing information.

16. The control method for a wireless communication device according to claim 15,
wherein the comparison between the forcing information held in the forcing information holding means and the forcing information received from the other wireless communication device is based on the priority of each forcing information.

17. The control method for a wireless communication device according to claim 15, wherein the priority of the forcing information is based on the number of the relay stations through which the forcing information is to be transmitted.

18. A computer program product stored in a computer-readable medium of a wireless communication device, the computer-readable medium including executable instructions that when executed by a processor performs steps for communicating with a destination device outside a communication range of the own device through at least one relay station, the wireless communication device including power mode controlling means for performing saving control of power supplied to the own device and forcing information holding means for holding forcing information including a forced mode flag indicating whether a forced operation instruction concerning the power saving control is enabled or disabled, and the forcing information including information corresponding to a limited number of the relay stations through which the forcing information is to be transmitted, said steps comprising:
- receiving the forcing information in another wireless communication device within the communication range of the own device from the other wireless communication device;
- updating the forcing information held in the forcing information holding means on the basis of a result of comparison between the forcing information held in the forcing information holding means and the forcing information received from the other wireless communication device; and
- transmitting the updated forcing information to the other wireless communication device.

19. The computer program product according to claim 18, wherein the forcing information held in the forcing information holding means and the forcing information received from the other wireless communication device each include information corresponding to a priority of the forcing information.

20. The computer program product according to claim 19, wherein the comparison between the forcing information held in the forcing information holding means and the forcing information received from the other wireless communication device is based on the priority of each forcing information.

21. The computer program product according to claim 19, wherein the priority of the forcing information is based on the number of the relay stations through which the forcing information is to be transmitted.

22. A wireless communication device communicating with a destination device outside a communication range of the own device through at least one relay station, the wireless communication device comprising:
- a power mode controlling unit configured to perform saving control of power supplied to the wireless communication device;
- a forcing information holding unit configured to hold forcing information including a forced mode flag indicating whether a forced operation instruction concerning the power saving control is enabled or disabled, and the forcing information including information corresponding to a limited number of the relay stations through which the forcing information is to be transmitted;
- a forcing information transmitting unit configured to transmit the forcing information to another wireless communication device within the communication range of the own device; and
- a forcing-information update controlling unit configured to update the forcing information.

23. A wireless communication device communicating with a destination device outside a communication range of the own device through at least one relay station, the wireless communication device comprising:
- a power mode controlling unit configured to perform saving control of power supplied to the wireless communication device;
- a forcing information holding unit configured to hold forcing information including a forced mode flag indicating whether a forced operation instruction concerning the power saving control is enabled or disabled, and the forcing information including information corresponding to a limited number of the relay stations through which the forcing information is to be transmitted;
- a forcing information transmitting unit configured to transmit the forcing information to another wireless communication device within the communication range of the own device;
- a forcing information receiving unit configured to receive forcing information held in the other wireless communication device from the other wireless communication device; and
- a forcing-information update controlling unit configured to update the forcing information held in the forcing information holding means on the basis of a result of comparison between the forcing information held in the forcing information holding means and the forcing information received from the other wireless communication device.

24. The wireless communication device according to claim 23, wherein the forcing information held in the forcing information holding means and the forcing information received from the other wireless communication device each include information corresponding to a priority of the forcing information.

25. The wireless communication device according to claim 24, wherein the comparison between the forcing information held in the forcing information holding means and the forcing information received from the other wireless communication device is based on the priority of each forcing information.

26. The wireless communication device according to claim 24, wherein the priority of the forcing information is based on the number of the relay stations through which the forcing information is to be transmitted.

* * * * *